Sept. 26, 1967 R. C. PUTMAN, SR 3,343,638

ARTICLE RECEIVING AND STORAGE APPARATUS

Filed May 31, 1961 13 Sheets-Sheet 1

INVENTOR:
RAYMOND C. PUTMAN, SR

BY Eaton, Bell, Hunt & Seltzer
ATTORNEYS

INVENTOR:
RAYMOND C. PUTMAN, SR

BY Eaton, Bell, Hunt & Seltzer
ATTORNEYS

Sept. 26, 1967 R. C. PUTMAN, SR 3,343,638

ARTICLE RECEIVING AND STORAGE APPARATUS

Filed May 31, 1961 13 Sheets-Sheet 3

INVENTOR

RAYMOND C. PUTMAN, SR

BY Eaton, Bell, Hunt & Seltzer

ATTORNEYS

Sept. 26, 1967 R. C. PUTMAN, SR 3,343,638

ARTICLE RECEIVING AND STORAGE APPARATUS

Filed May 31, 1961 13 Sheets-Sheet 4

INVENTOR:
RAYMOND C. PUTMAN, SR.

BY Eaton, Bell, Hunt & Seltzer
ATTORNEYS

Sept. 26, 1967 R. C. PUTMAN, SR 3,343,638

ARTICLE RECEIVING AND STORAGE APPARATUS

Filed May 31, 1961 13 Sheets-Sheet 5

INVENTOR:
RAYMOND C. PUTMAN, SR
By Eaton, Bell, Hunt & Seltzer
ATTORNEYS

Sept. 26, 1967 R. C. PUTMAN, SR 3,343,638

ARTICLE RECEIVING AND STORAGE APPARATUS

Filed May 31, 1961 13 Sheets-Sheet 6

Sept. 26, 1967 R. C. PUTMAN, SR 3,343,638

ARTICLE RECEIVING AND STORAGE APPARATUS

Filed May 31, 1961 13 Sheets-Sheet 7

INVENTOR:

RAYMOND C. PUTMAN, SR.

BY Eaton, Bell, Hunt & Seltzer

ATTORNEYS

INVENTOR:
RAYMOND C. PUTMAN, SR
BY Eaton, Bell, Hunt & Seltzer
ATTORNEYS

ARTICLE RECEIVING AND STORAGE APPARATUS

INVENTOR:
RAYMOND C. PUTMAN, SR.
BY Eaton, Bell, Hunt & Seltzer
ATTORNEYS

Sept. 26, 1967 R. C. PUTMAN, SR 3,343,638
ARTICLE RECEIVING AND STORAGE APPARATUS
Filed May 31, 1961 13 Sheets-Sheet 10
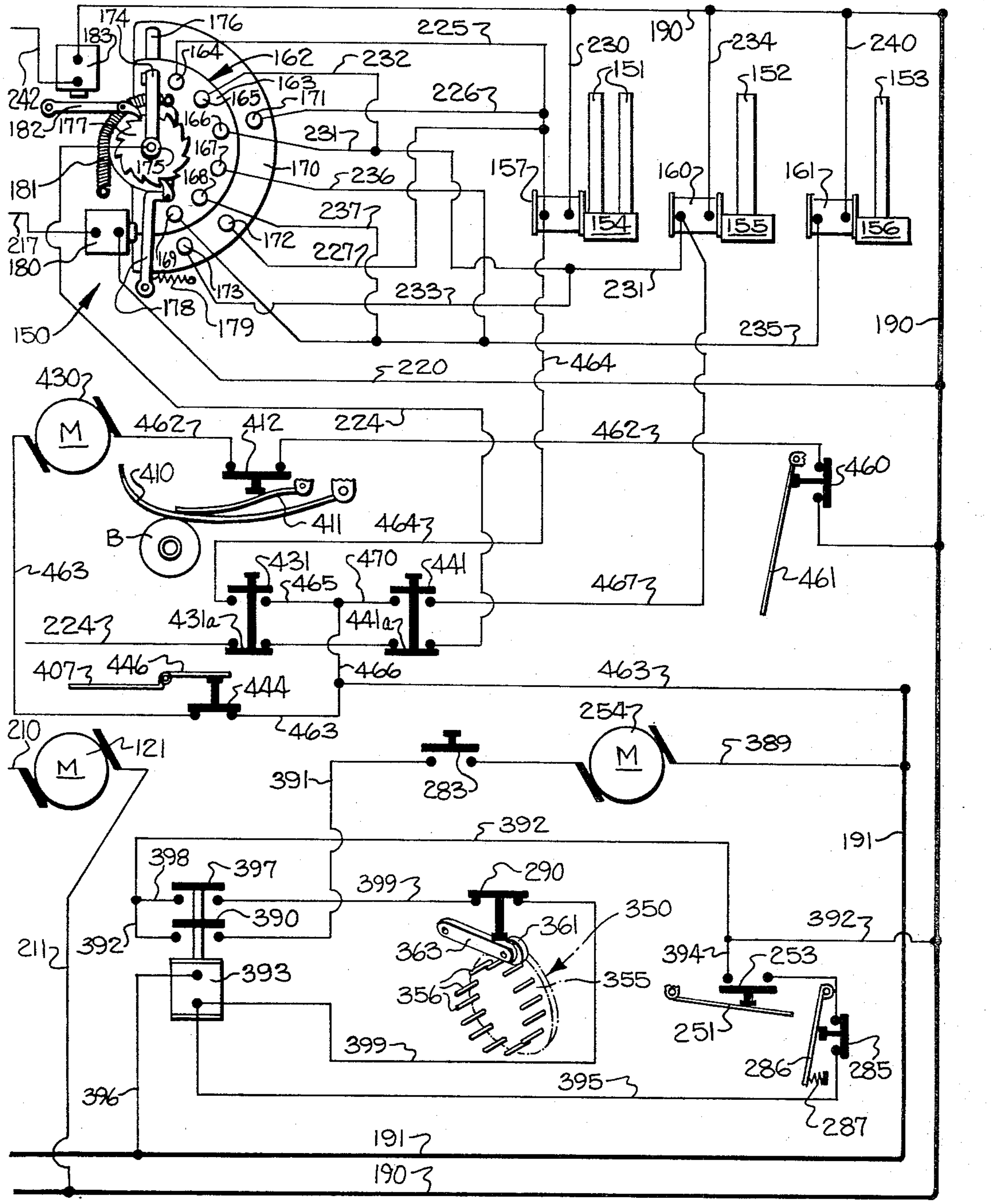
Fig-11-A
INVENTOR:
RAYMOND C. PUTMAN, SR.
BY Eaton, Bell, Hunt & Seltzer
ATTORNEYS Sept. 26, 1967 R. C. PUTMAN, SR 3,343,638

ARTICLE RECEIVING AND STORAGE APPARATUS

Filed May 31, 1961 13 Sheets-Sheet 11

INVENTOR:
RAYMOND C. PUTMAN, SR.

BY Eaton, Bell, Hunt & Seltzer
ATTORNEYS

Sept. 26, 1967 R. C. PUTMAN, SR 3,343,638

ARTICLE RECEIVING AND STORAGE APPARATUS

Filed May 31, 1961 13 Sheets-Sheet 12

INVENTOR:
RAYMOND C. PUTMAN, SR.
BY Eaton, Bell, Hunt & Seltzer
ATTORNEYS

United States Patent Office 3,343,638
Patented Sept. 26, 1967

3,343,638
ARTICLE RECEIVING AND STORAGE APPARATUS

Raymond C. Putman, Sr., Hickory, N.C., assignor to Taylor Manufacturing Company, Salisbury, N.C., a corporation of North Carolina Filed May 31, 1961, Ser. No. 113,908
24 Claims. (Cl. 194—4)

This invention relates generally to an apparatus for receiving and storing articles and more particularly to an apparatus for receiving and storing articles such as cartons of empty soft drink bottles and the like as well as individual bottles of all sizes and for reimbursing the customer for deposits thereon when they are returned to the place of purchase.

In my copending application, Ser. No. 761,409, filed Sept. 16, 1958, of which the present application is a continuation-in-part, an article receiving and storing apparatus was disclosed having a pair of carton receiving stations for the receipt of cartons containing bottles therein, and a conveyor at each carton receiving station for conveying the cartons of bottles from the carton receiving station to a temporary storage area for each conveyor. The apparatus further contained carton sensing means for actuating the conveyor when the carton with the bottles therein was placed in the carton receiving station and bottle sensing means for counting the number of bottles in the carton as the conveyor moves the carton from the carton receiving station to the temporary storage area. The bottle sensing means actuates a coin return device for returning to the customer the amount of deposit upon each of the bottles as the same moves past the bottle sensing means.

The apparatus further provides means for transferring the cartons from the temporary storage areas to main storage areas integral with the apparatus when a certain number of cartons have been deposited in the temporary storage areas. The fact that the main storage areas were integral with the apparatus required that the apparatus be removed from use when the main storage areas were filled until said areas could be emptied.

It is noted that in my said copending application a plurality of carton receiving stations each having separate conveyors and other like parts were provided with consequent increased cost of construction due to the duplication of parts. Also, the upper article receiving station was open to the customer at all times except when the particular main storage area that that carton receiving station serviced was filled with cartons. The lower article receiving station was closed to the ingress of cartons by a pivoted gate but was open sufficiently for the ingress of the hand of a customer. The upper carton receiving station was closed by a similar pivoted gate when the storage area was filled. When the upper pivoted gate was closed, the lower gate would open to allow cartons to be placed in the lower article receiving station. Even when the pivoted gates were closed, a portion of the conveying mechanism at each station was open thereby creating a safety hazard especially in the case of children who might have either portions of their clothing or their hands caught in the conveying mechanism when the same was actuated.

It is also noted that the apparatus disclosed in my copending application was able to receive only bottles which were placed in cartons thereby necessitating that a supply of cartons be maintained adjacent the apparatus so that people who were returning bottles which were not in a carton would have a carton in which to place the bottles so that the same could be placed in the apparatus. This feature was undesirable since the supply of cartons was unsightly, took up considerable floor space and was undesirable from a customer's standpoint inasmuch as the customer must transfer the bottles into the carton and then the carton into the apparatus.

The present invention was developed to obviate the aforementioned deficiencies in the apparatus disclosed in my copending application and other deficiencies found in the prior art. The present invention provides an apparatus having a single carton receiving station, associated carton handling mechanism, temporary storage area, and means for moving the cartons from the temporary storage area to a detachable main storage rack mounted on wheels for easy transfer to or from the carton receiving apparatus and having a plurality of vertically spaced storage compartments. The carton receiving station, associated carton handling mechanism, temporary storage area and carton moving means are all mounted on an elevator mechanism for vertical movement to aline with the different compartments in the main storage rack.

It is noted that the present arrangement prevents duplication of parts and thereby provides a simpler and less expensive apparatus. Further, the detachable main storage rack allows a full rack to be removed and an empty rack to be placed in position to receive the cartons from the temporary storage area with a minimum amount of stoppage time when the apparatus must be out of use.

The apparatus of the present invention further provides a number of safety features not found heretofore. For example, a door is provided for opening and closing the carton receiving station which is adapted to open a safety switch when opened to prevent operation of the carton handling mechanism. Also, safety switches are provided to prevent operation of the carton handling means when cartons become jammed in the apparatus.

The apparatus of the present invention still further provides, in combination with the carton receiving portion, an individual bottle receiving station and associated bottle handling mechanism for receiving bottles, not confined in cartons, of varying size, such as 6, 8, 12 or 32 ounce sizes, thereby obviating the necessity of having a supply of empty cartons at the apparatus and the necessity of the customer having to place the individual bottles in such an empty carton. Further, the present apparatus is capable of receiving the 32 ounce or quart size bottle and returning the correct amount of deposit therefor which has not heretofore been possible in an apparatus of this type having a single bottle receiving station.

It is therefore a primary object of the present invention to provide apparatus for successively receiving and storing both cartons of bottles and individual bottles not in a carton returned to the place of purchase and for reimbursing the customer for the deposit thereon.

A further object of the present invention is to provide an improved article receiving and storage apparatus having a single carton receiving station with associated conveying means, carton sensing means, bottle sensing means, temporary storage area and means for moving the cartons from the temporary storage area into a main storage area having a plurality of storage compartments wherein said carton receiving station and associated storage area are mounted for vertical movement to aline with the different plurality of compartments in the main storage area.

A more specific object of the present invention is to provide an improved article receiving and storage apparatus having a main storage area consisting of several vertically spaced compartments and having a single carton receiving station, temporary storage area, conveyor for moving cartons from the carton receiving station into the temporary storage area, carton sensing means for actuating said conveyor, bottle sensing means for determining the number of bottles within the carton, means for moving the cartons placed in the temporary storage area into one of the compartments of the main storage area and means for moving the single carton receiving station, associated temporary storage area and carton handling mechanism into alinement with the plurality of different storage compartments in the main storage area upon successive filling of the preceding lower compartments.

A further object of the present invention is to provide an improved article receiving and storage apparatus capable of receiving both confined bottles in cartons and unconfined individual bottles of all sizes upon which a deposit has been given, having a carton receiving station and an individual bottle receiving station, means for moving the carton having bottles therein into a temporary storage area, bottle sensing means for determining the number of bottles in the carton, means for moving the cartons in the temporary storage area into a main storage area, conveying means for moving the unconfined individual bottles from the individual bottle receiving station, sensing means for determining the type of individual bottle placed in the individual bottle receiving station and means for returning the correct amount of deposit on each of the different types of bottles which have been placed in the individual bottle receiving station and the sum of the deposits on the bottles in the carton which has been placed in the carton receiving station.

Some of the objects of the invention having been stated, other objects will appear as the description proceeds, when taken in connection with the accompanying drawings, in which:

FIGURES 11 and 11A are schematic views showing the wiring diagram for the carton handling, coin refund, carton shifting, elevator drive and individual bottle handling mechanisms of the apparatus of the present invention with associated structural parts shown schematically;

Figure 1:
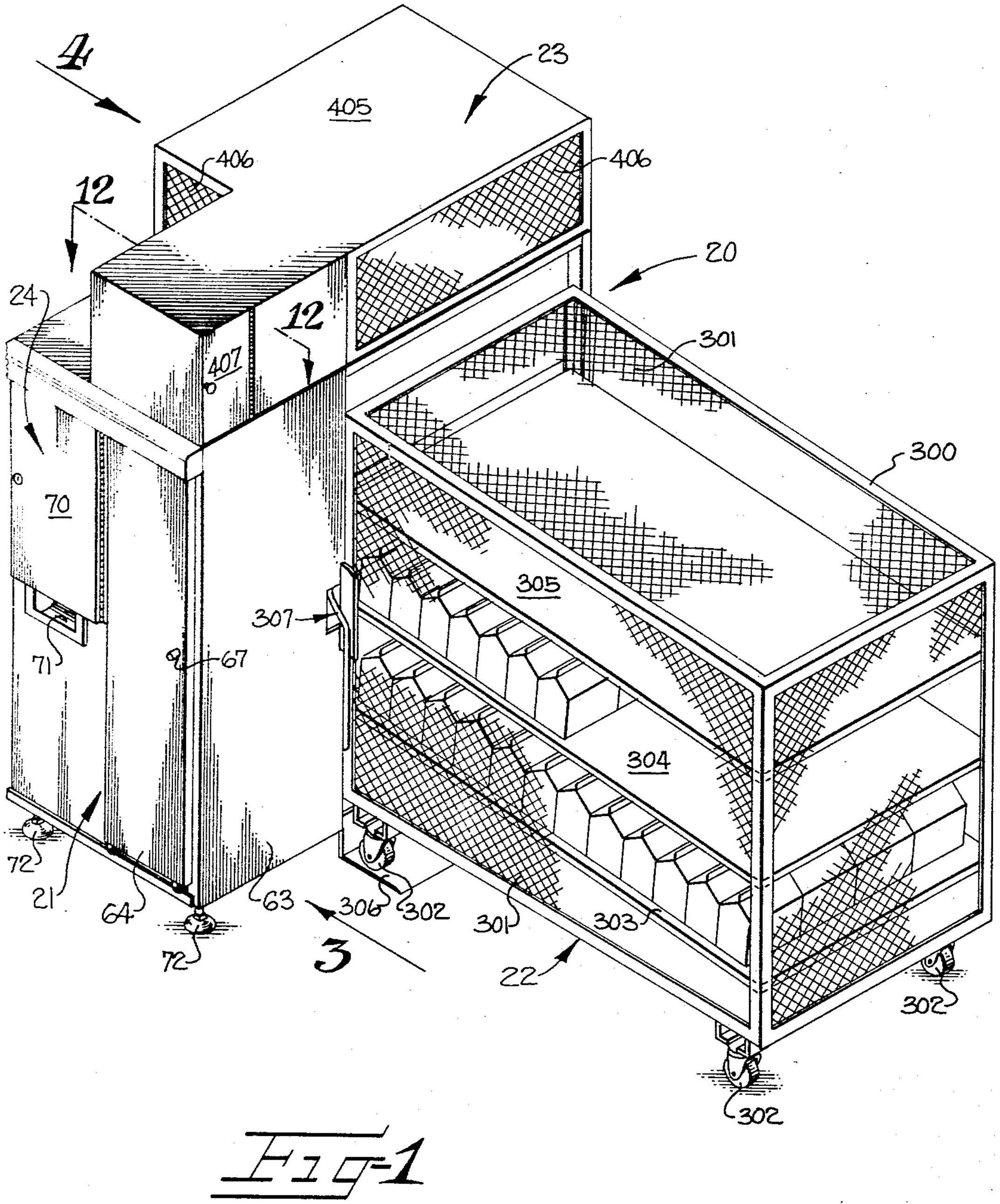
FIGURE 1 is a perspective view of the improved apparatus of the present invention showing cartons within the main storage rack.

Referring to the drawings and particularly to FIGURE 1, the article receiving and storing apparatus 20 comprises a carton receiving portion indicated generally at 21, a main carton storage rack indicated generally at 22, an individual bottle receiving and storage portion indicated generally at 23 and a coin return portion indicated generally at 24.

CARTON RECEIVING PORTION

Figure 2:
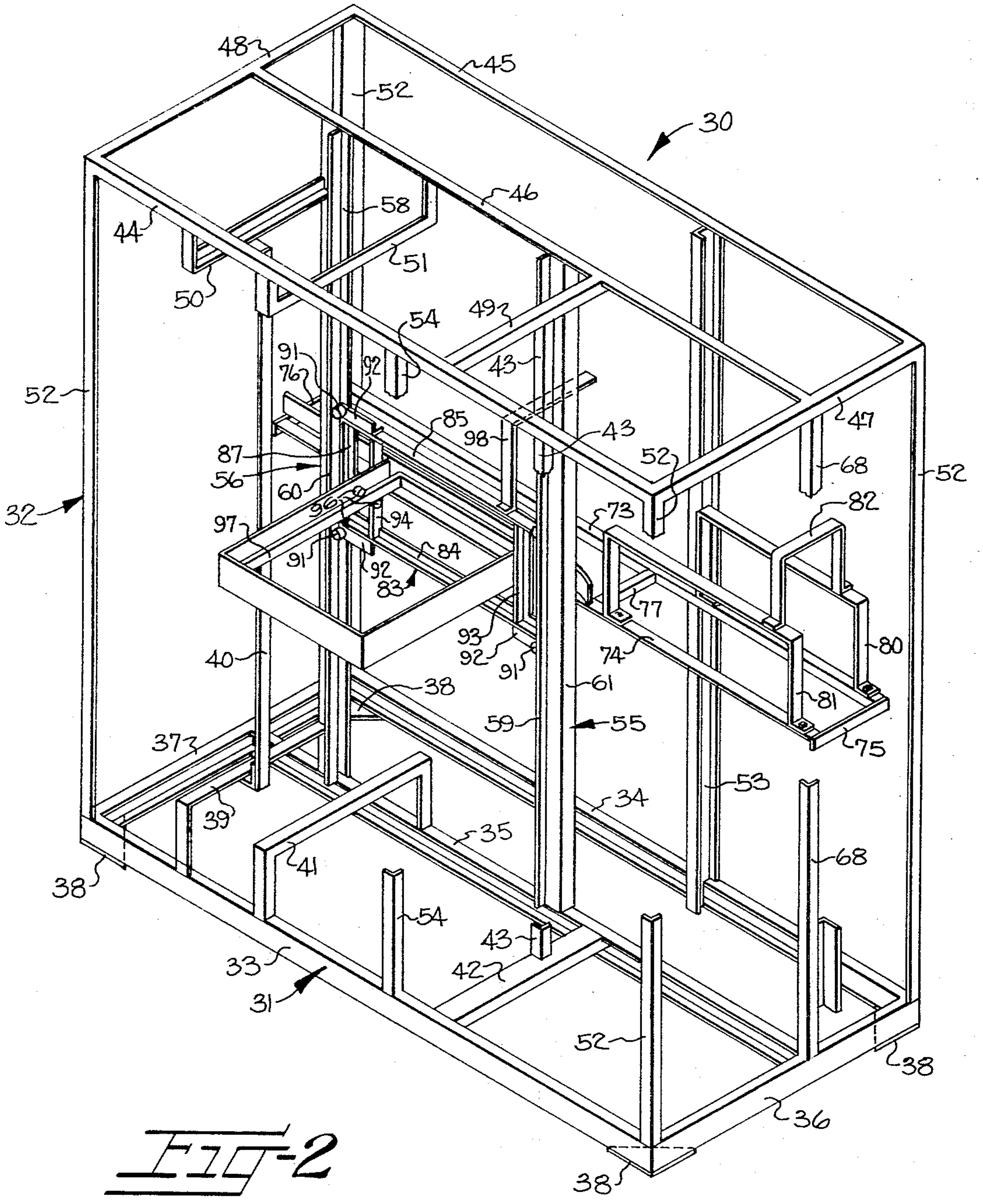
FIGURE 2 is a perspective view of the framework of the carton receiving portion of the improved apparatus of the present invention with portions broken away for clarity.

The carton receiving portion 21 comprises a suitable frame indicated generally at 30 (FIGURE 2) comprising a base frame portion 31 and an upper or top frame portion 32. Base frame portion 31 comprises three longitudinally extending spaced apart members 33, 34, 35 connected at either end by transverse channel members 36, 37 attached thereto by any suitable means such as welding. The corners of the lower frame portion 31 are braced by suitable triangular plates 38 fixed thereon by any suitable means such as welding or the like.

A bracket 39 is mounted on the member 33 at one end and supports a vertically extending member 40 thereon. A suitable motor bracket 41 is supported on the longitudinally extending members 33 and 35. A transverse frame member 42 is connected at one end to longitudinally extending member 33 and at the other end to member 35 for supporting the lower end of a vertical brace 43.

The top frame portion 32 comprises three longitudinal extending frame members 44, 45, 46 connected at their opposite ends by transverse frame members 47, 48. The longitudinal frame member 44 is connected intermediate its ends to the longitudinal frame member 46 by a transverse frame member 49 which acts as a brace and also supports the upper end of vertical brace 43. A bracket 50 is supported by longitudinally extending member 44 and supports the upper end of the vertically extending member 40. A shaft supporting bracket 51 is supported by longitudinally extending members 44 and 46.

The base frame portion 31 and top frame portion 32 are connected together at the corners by suitable angle members 52. A channel member 53 is connected at its opposite ends to the transverse frame members 34, 45 and is spaced from the right hand rear corner frame member 52 a distance equal to the width of the main carton storage rack 22 to define the carton egress opening. An angle member 54 is connected at its opposite ends to the longitudinal frame members 33, 44 and serves to further support the top frame portion 32 upon the base frame portion 31.

A pair of columns 55, 56 are supported on the longitudinal frame member 35 and are connected to the longitudinal frame member 46 at the upper ends and serve as supporting members and as guide tracks for the vertically movable carton receiving and temporary storing mechanism to be presently described. The columns 55, 56 comprise a pair of channel members 57, 58 (FIGURE 5) having flanges 59, 60 formed integral with or attached to said channel members 57, 58. The channel members 57, 58 are braced by angle members 61, 62 to provide stronger columns.

Figure 3:
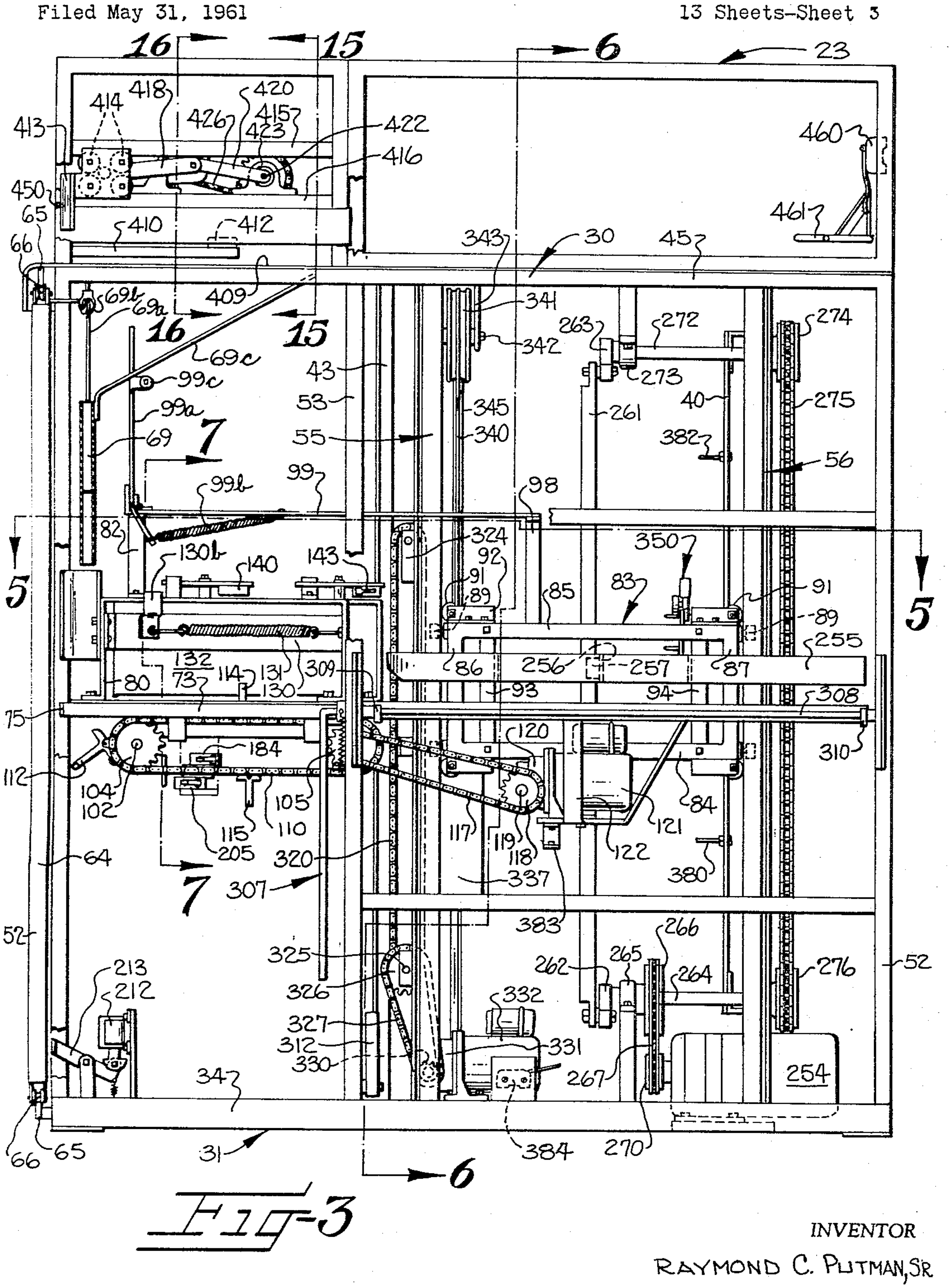
FIGURE 3 is a side elevation of the apparatus of the present invention looking in the direction of arrow 3 in FIGURE 1 with the main storage area, the right hand side cover and portions of the apparatus within the cover removed for clarity.

The frame 30 of the carton receiving apparatus 21 is provided with a suitable cover 63 of sheet material or the like (FIGURE 1) except for an opening provided for the receipt of the open end of the main carton storage rack 22 and an opening closed by a suitable door 64 provided for the ingress of cartons into the carton receiving portion of the apparatus. The door 64 is mounted on suitable tracks 65 by means of wheels 66 for slidable movement between an open and a closed position (FIGURES 1 and 3). Door 64 is provided with a suitable handle 67 for moving the door between the open and the closed position.

An angle member 68 is supported on transverse frame member 36 (FIGURE 2) and is connected to the transverse frame member 47 to form with the forward right hand corner member 52 of the ingress opening which door 64 opens and closes. A counterweight 69 is connected to door 64 by a suitable rope **69*a* and pulley 69*b* (FIGURE 4) for biasing the same toward the closed position. A bracket member 69*c* is mounted on counterweight 69** and extends upwardly therefrom at an angle for reasons to be presently described.

The cover 63 also has an opening therein for the receipt of the coin return mechanism to be presently described which opening is closed by door 70 except for a coin return slot 71 therebelow. The carton receiving portion 21 is supported on a surface such as the floor or the like by suitable supporting members 72 which are suitably attached to the triangular braces 38 on the base frame 31.

ELEVATOR FRAME

The carton receiving and temporary storage mechanism includes an elevator frame (FIGURE 2) comprising a pair of longitudinally extending frame members 73, 74 which extend from the carton ingress opening in the cover 63 longitudinally of the carton receiving portion 21 to a point closely adjacent the rear of the apparatus. The longitudinal frame members 73, 74 are connected together at their opposite ends by transverse frame members 75, 76 and intermediate their ends by transverse member 77. Longitudinal frame members 73, 74 have a pair of upstanding brackets 80, 81 connected thereto which brackets are connected at their upper ends by a third bracket 82 to define a carton receiving station.

Figure 5:
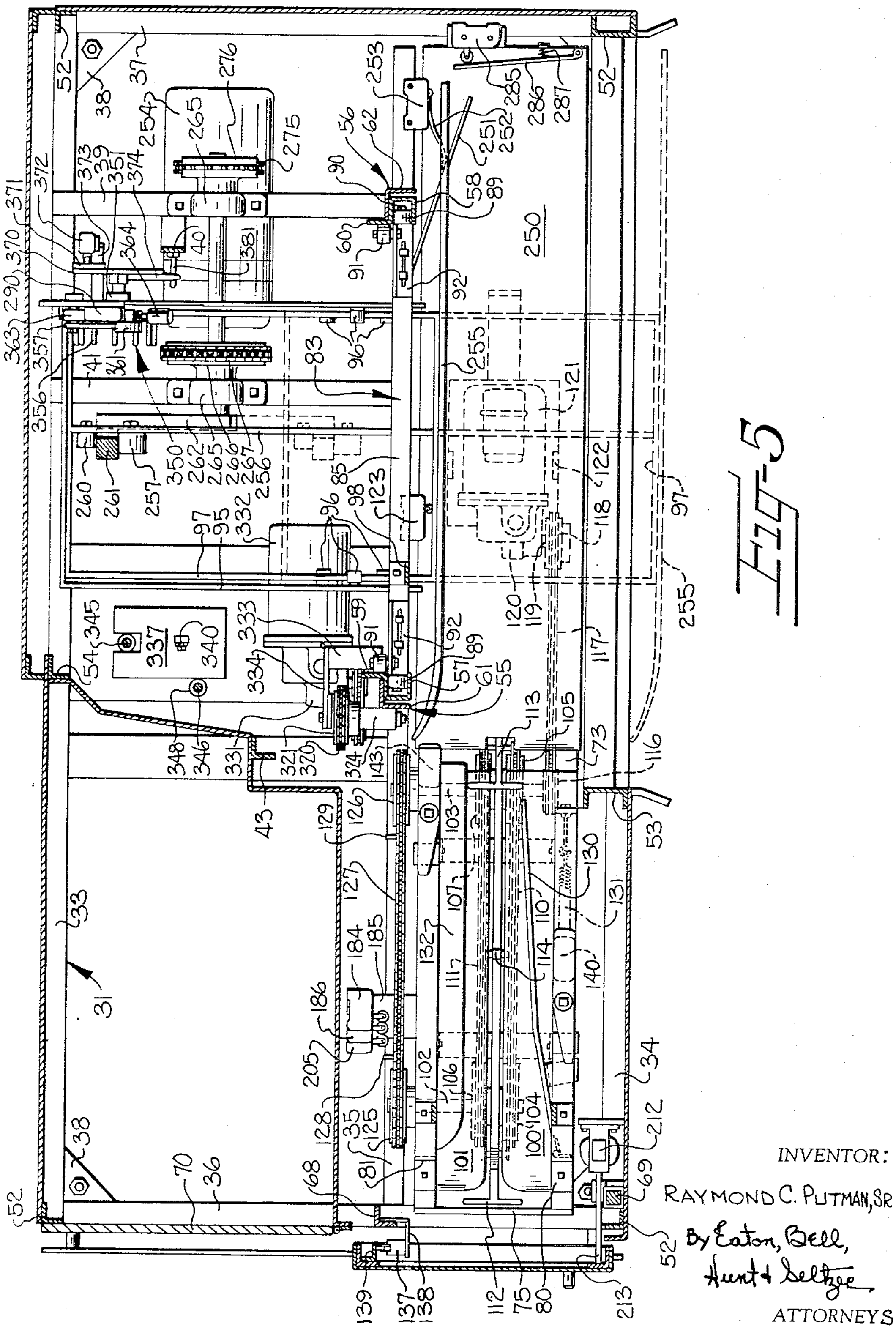
FIGURE 5 is a horizontal longitudinal section taken substantially along line 5—5 of FIGURE 3 with portions removed for clarity.

The longitudinal frame members 73, 74 and transverse frame members 75, 76, 77 are connected to a bracket member 83. Bracket 83 comprises a pair of longitudinal members 84, 85 and transverse members 86, 87. Bracket member 83 is mounted for vertical movement on columns 55, 56 by a first set of four wheels or rollers 89 mounted on the transverse members 86, 87 by suitable bolts 90 extending outwardly thereof and being positioned within the channels of channel members 57, 58 (FIGURE 5). Wheels 89 are adapted to roll within the channel on the sides thereof and be guided against sidewise movement by the sides of the channel members 57, 58. A second set of four wheels or rollers 91 (FIGURES 2 and 5) are mounted on the longitudinal members 84, 85 by suitable brackets 92 and extend laterally thereof into contact with the flanges 59, 60 on the channel members 57, 58. Wheels 91 and flanges 59, 60 are adapted to guide the bracket 83 against endwise movement as the bracket moves vertically up and down columns 55, 56.

Bracket 83 has a pair of transverse members 93, 94 (FIGURE 2) connected at their opposite ends to the longitudinal members 84, 85 intermediate the ends thereof. Transverse members 93, 94 support an open ended rectangular frame 95 which has two sets of three rollers 96 mounted thereon for the receipt of a rectangular drawer frame member 97 therebetween. Drawer member 97 is mounted between the two sets of three rollers 96 for sliding movement in said open ended frame member 94.

A bracket 98 is mounted on the longitudinal member 85 and extends outwardly therefrom. Bracket 98 supports one end of a cover plate 99 (FIGURE 3), the other end of which is supported by the bracket 82. An upstanding plate **99*a* is pivotally mounted on cover plate 99 and is biased to the vertical position by a suitable spring 99*b*. A roller 99*c* is mounted on plate 99*a* and is adapted to engage member 69*c* to cam plate 99*a* toward the horizontal position as the same approaches the top of the carton receiving portion 21. Cover plate 99 and upstanding plate 99*a*** isolate all of the carton receiving station and temporary storage area from the customer except for the carton ingress opening to prevent injury to the customer and tampering with the apparatus.

CARTON HANDLING MECHANISM

The carton receiving station, as aforementioned, is defined by the longitudinal frame members 73, 74, transverse members 75, 77, upstanding brackets 80, 81 and the transverse bracket 82. A pair of spaced-apart carton support plates 100 and 101 (FIGURE 5) are mounted on longitudinal frame members 73, 74 with the forward end thereof spaced rearwardly of the transverse frame member 75 and the rearward end thereof spaced forwardly of the transverse frame member 77. Carton support plates 100, 101 are adapted to slidably support a carton C when the same is placed thereon.

Frame members 73, 74 support a pair of shafts 102, 103 (FIGURES 3, 4 and 8) on which respective sprocket wheels 104, 105, 106, 107 are mounted and which in turn drivingly support respective sprocket chains 110, 111. Sprocket chains 110 and 111 are provided with special links which support a pair of upstanding carton engaging lugs 112, 113 spanning the distance between the chains 110 and 111. A second pair of lugs 114, 115 are spaced from said lugs 112, 113, respectively a distance substantially the same as the length of a carton and are carried by chains 110, 111 for providing stops against which the forward edge of the carton C engages when the carton is placed into the carton receiving station. The lugs 112, 113 are thus adapted to engage the rearmost surface of a carton C within the carton receiving station and to slidably move the same along the carton support plates 100 and 101 rearwardly of the carton receiving station off of the carton support plates 100, 101. It is thus evident that the spacing between the lugs of each respective pair serves to insure that only one carton may be inserted upon each sequential opening of door 64.

Rotation is imparted to the chains 110 and 111 by rotation of a sprocket 116 (FIGURE 7) mounted on one end of shaft 103 and adapted to rotate shaft 103 and sprockets 105. 107. Sprocket 116 drivingly supports one end of a chain 117 which extends downwardly and rearwardly as seen in FIGURE 3. Chain 117 drivingly engages at its other end a sprocket 118 mounted on the output shaft 119 of a suitable gear reduction unit 120. An electric motor 121 is drivingly connected to the input shaft (not shown) of the gear reduction unit 120 for imparting rotation thereto. Motor 121 is supported on the elevator framework by a bracket 122.

A normally open safety switch 123 is mounted on bracket 83 and is adapted to be engaged and closed by a portion of the carton shifting mechanism to be presently described. Switch 123 is connected into the circuit of conveyor chain drive motor 121 and is adapted when open to break the same to prevent operation of the conveyor chains 110, 111 when the carton shifting mechanism is operating for reasons to become apparent presently.

A pair of sprockets 125 and 126 (FIGURE 5) are mounted on the ends of shafts 102 and 103, respectively, for rotation therewith and which, in turn, drivingly support a control chain 127. Control chain 127 has a pair of switch engaging fingers 128, 129 mounted thereon at points spaced 180 degrees apart for movement therewith.

A first carton guide plate 130 (FIGURE 5) is pivotally mounted at its forward end to the forward upstanding leg of the bracket 80. Carton guide plate 130 has a bracket **130*a* mounted thereon and extending laterally outwardly thereof with an upstanding portion 130*b* adapted to engage the top portion of bracket 80 to limit the amount of movement of the carton guide plate 130 about its pivot. A suitable tension spring 131 is attached at one end to the bracket 130*a* and at the other end to the rearward upstanding leg of the bracket 80 to bias the carton guide plate 130 for counterclockwise movement about its pivot as seen in FIGURE 5 into the path of movement of a carton C along the carton support plates 100, 101.**

Figure 7:
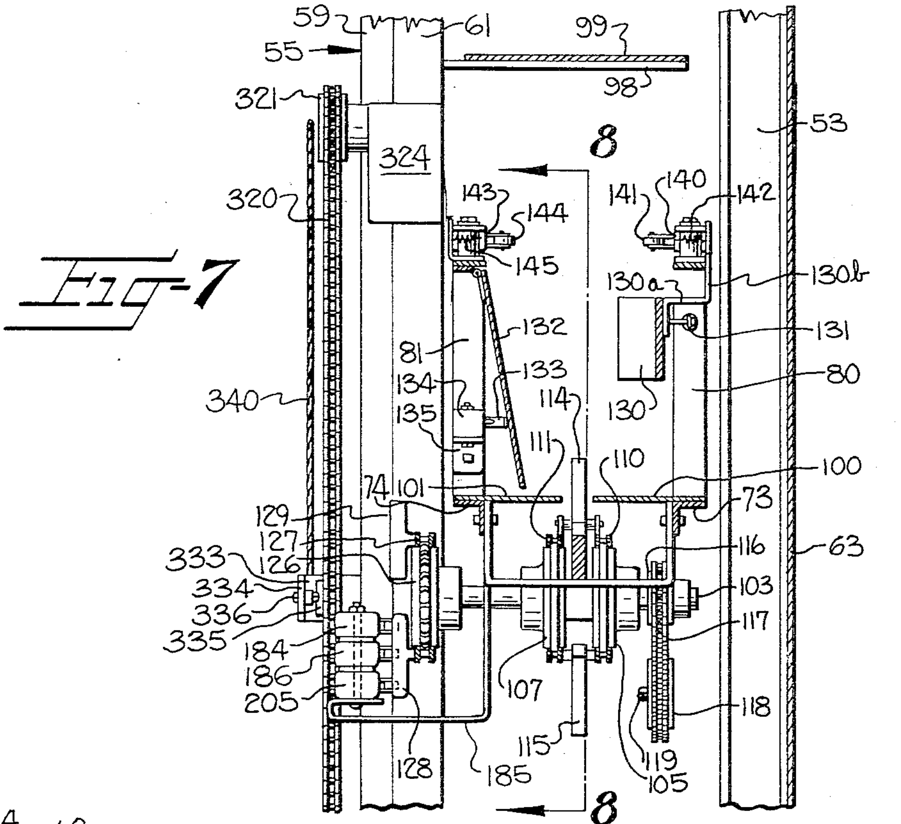
FIGURE 7 is an enlarged sectional view taken substantially along line 7—7 of FIGURE 3 of a detail of the apparatus with portions removed and broken away for clarity.

A second carton guide plate 132 (FIGURE 7) is pivotally mounted at its upper edge to the top portion of bracket 81. A spring arm 133 of any suitable spring material is mounted on the rearward upstanding leg of bracket 81 and extends forwardly thereof into engagement with carton guide plate 132. Spring arm 133 biases carton guide plate 132 to the right as seen in FIGURE 7 into the path of movement of a carton C along the carton support plates 100, 101.

It will be noted (FIGURE 5) that the forward end of the carton guide plate 130 is angled outwardly and the forward end of carton guide plate 132 is tapered or flared outwardly so that a carton may be easily placed therebetween in the carton receiving station on the carton support plate 100 and 101. The carton receiving station is provided with a carton sensing switch 134 (FIGURES 7 and 11) which is supported by a suitable bracket 135 on the rearward upstanding leg of bracket 81. The carton sensing switch 134 is adapted to be closed by the spring arm 133 when a carton is placed in the carton receiving station and the carton guide plate 132 is pivoted to the left as seen in FIGURE 7. Switch 134 completes the circuit to the motor 121 which drives the conveyor chains 110 and 111 to move the carton rearwardly along the carton supporting plates 100 and 101.

To provide a safety feature to prevent injury to the customer and also to prevent tampering with the carton handling mechanism, door 64 must be in closed position before the motor 121 will drive the conveyor chains 110 and 111. A switch 137 (FIGURE 5) is positioned on the lower part of the frame member 68 by a bracket 138 in the path of movement of door 64 to the closed position and is adapted to be engaged by a bracket 139 mounted on door 64 adjacent the left hand lower corner as seen in FIGURE 1. Switch 137 is connected in the circuit which provides electric current to motor 121 for driving the conveyor chains 110, 111 (FIGURE 11) and must be engaged and closed by door 64 before the conveyor chains 110, 111 will operate.

Figure 8:
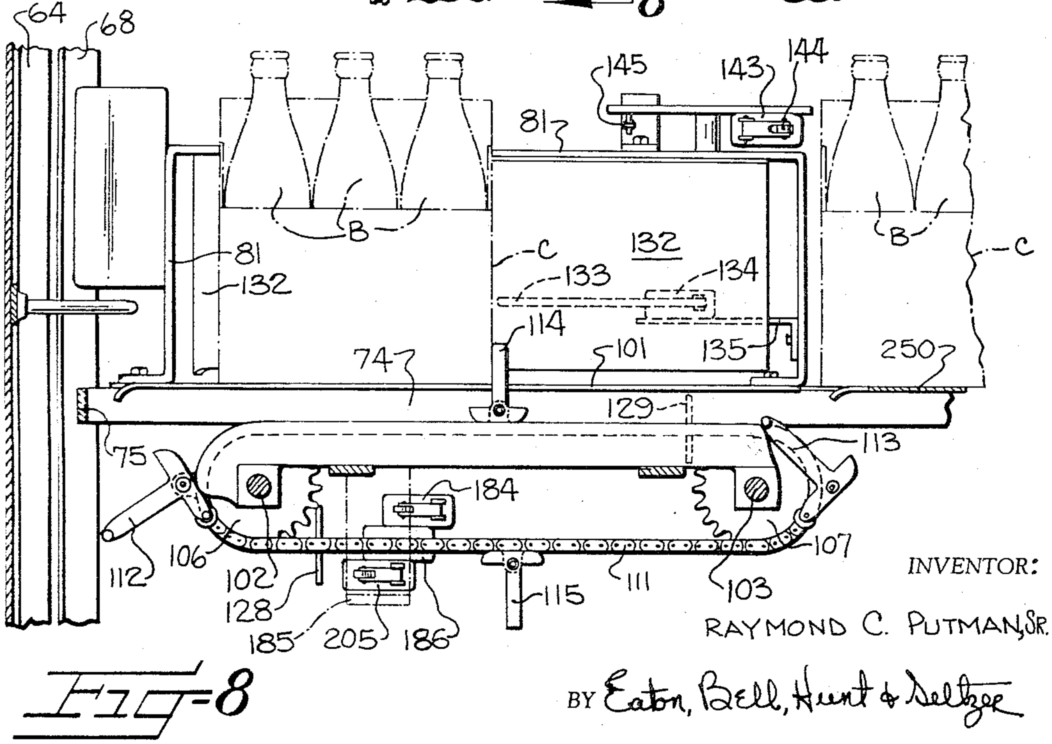
FIGURE 8 is an enlarged sectional view taken substantially along line 8—8 of FIGURE 7.

When the conveyor chains 110 and 111 rotate, either lug 112 or 113 will pass above the forward ends of the respective carton support plates 100, 101 between such forward ends and the transverse member 75 to engage the rear surface of a carton C which has been placed in the carton receiving station upon the carton support plates 100, 101 and to move the same along the corresponding carton support plates 100, 101 in a direction from right to left in FIGURE 8. Lug 112 or 113 will continue to pass above the respective carton support plates 100, 101 until the carton C is moved off of the rear end of the support plates. At this time, the lug will pass downwardly between the rearward ends of the support plates 100, 101 and the transverse member 77.

A first bottle sensing switch 140 (FIGURES 4 and 7) is mounted on the top portion of bracket 80 intermediate the ends thereof and spaced from the rearward end of the carton support plates 100, 101 a distance not less than the length of a carton C. Switch 140 has a plunger 141 thereon which projects into the path of the bottles B contained within the right side of a carton C as the same moves along the support plates 100, 101. A suitable tension spring 142 biases the plunger 141 into the path of the bottles B. Plunger 141 is adapted to be sequentially engaged and moved to the right as seen in FIGURE 7, thereby closing switch 140 to count the number of bottles on that side of the carton.

A second bottle sensing switch 143 is mounted on the top portion of bracket 81 adjacent the rearward end thereof and spaced a distance at least equal to the length of a carton along the path of travel of a carton on the support plates 100, 101 from the switch 140. Switch 143 has a plunger 144 thereon which projects into the path of the bottles B contained within the left side of the carton as the same moves along the support plates 100, 101. A suitable tension spring 145 biases plunger 144 into the path of the bottles B. Plunger 144 is adapted to be sequentially engaged and moved to the left as seen in FIGURE 7 thereby closing switch 143 to count the number of bottles on that side of the carton.

The staggering of the switches 140 and 143 is provided so that only one bottle will be counted at a time which simplifies the coin returning mechanism. The switches 140 and 143 are electrically connected to a coin returning mechanism or device broadly indicated at 150 (FIGURES 11 and 11A) to be later described.

COIN REFUND MECHANISM

The coin refund or return device 150 (FIGURE 11A) may be of any conventional type and is illustrated as having a plurality of coin receiving and supporting tubes 151, 152 and 153, respectively. The lower ends of the coin tubes 151, 152, 153 terminate above respective coin release plates or gates 154, 155, 156 adapted to release coins from the tubes upon lateral sliding movement thereof. The respective coin release plates 154, 155, 156 are moved by energization of respective electrically controlled solenoids 157, 160, 161 connected thereto.

Solenoids 157, 160, 161 are energized through a totalizing device indicated generally at 162. Totalizer 162 comprises a first contact plate 163 having a first contact 164 thereon connected to solenoid 157. Contact plate 163 has second and third contacts 165, 166 thereon connected to solenoid 160 and fourth, fifth and sixth contacts 167, 168, 169 thereon connected to solenoid 161. A second contact plate 170 is mounted adjacent the first contact plate 163 and has first and second contacts 171, 172 thereon in radial alinement with contacts 166, 168 on plate 163, respectively, connected to solenoid 157, and a third contact 173 thereon in radial alinement with contact 169 on plate 163 connected to solenoid 160.

A first contact arm 174 is mounted at one end to a shaft 175 for rotation therewith and extends outwardly therefrom a distance at least equal to the distance the contacts 164–169 are spaced from the shaft 175 such that the outer end thereof will sequentially come in contact therewith as the shaft 175 rotates. A second contact arm 176 is mounted at one end on the shaft 175 for rotation therewith and extends outwardly therefrom in alinement with contact arm 174 a distance at least equal to the distance the contacts 171–173 are spaced from such shaft 175 that the outer end thereof will sequentially come in contact therewith as the shaft 175 rotates.

A ratchet wheel 177 is mounted on shaft 175 in driving relationship thereto. A pawl 178 is pivotally mounted on a suitable frame member (not shown) and engages the teeth of ratchet wheel 177 in driving relationship. Pawl 178 is biased to the inoperative position, shown in full lines in FIGURE 11, by a suitable tension spring 179. A solenoid 180 is connected to the pawl 178 and is adapted when energized to move the pawl 178 against the action of spring 179 to rotate the ratchet wheel 177 one increment of rotation.

It is noted that, when the ratchet wheel 177 rotates one increment, the contact arm 174 will move into contact with contact 164 and sequentially into contact with the remaining contacts 165–169 upon each additional increment of rotation of the ratchet wheel 177. The contact arm 176 will not contact the contact 171 until the ratchet wheel 177 has been moved three increments of rotation, the contact 172 until the ratchet wheel 177 has been moved five increments of rotation, and the contact 173 until the ratchet wheel 177 has been moved six increments of rotation.

A suitable tension spring 181 is attached at one end to a suitable frame member (not shown) and at the other end to the ratchet wheel 177 to bias the ratchet wheel to the zero total position shown in FIGURE 11A. A locking pawl 182 is pivotally mounted at one end to a suitable frame member (not shown) and extends into engagement with the teeth of ratchet wheel 177 on the opposite side from the driving pawl 178 to hold the ratchet wheel in the position to which it is moved by the driving pawl 178. A solenoid 183 is connected to the locking pawl 182 and is adapted when energized to move the locking pawl out of engagement with the teeth of ratchet wheel 177 to allow spring 181 to return the ratchet wheel to the zero or starting position.

A payoff switch 184 is provided in the electrical connection to the solenoids 157, 160, 161 through the totalizer 162. Switch 184 is mounted on a suitable bracket 185 supported by the longitudinal frame member 74 adjacent the control chain 127 in the line of movement of the switch engaging fingers 128, 129. A reset switch 186 is also mounted on bracket 185 in the path of movement of fingers 128, 129 and is connected in the electrical connection to the solenoid 183 connected to the locking pawl 182.

Although only a coin return device is shown, it is contemplated that any conventional refund mechanism may be used. For example, the refund mechanism may be modified to dispense tokens or printed receipts having a monetary value in accordance with the size of an individual bottle or in accordance with the number of bottles contained in a carton.

WIRING DIAGRAM FOR CARTON HANDLING AND COIN REFUND MECHANISMS

Figure 11:
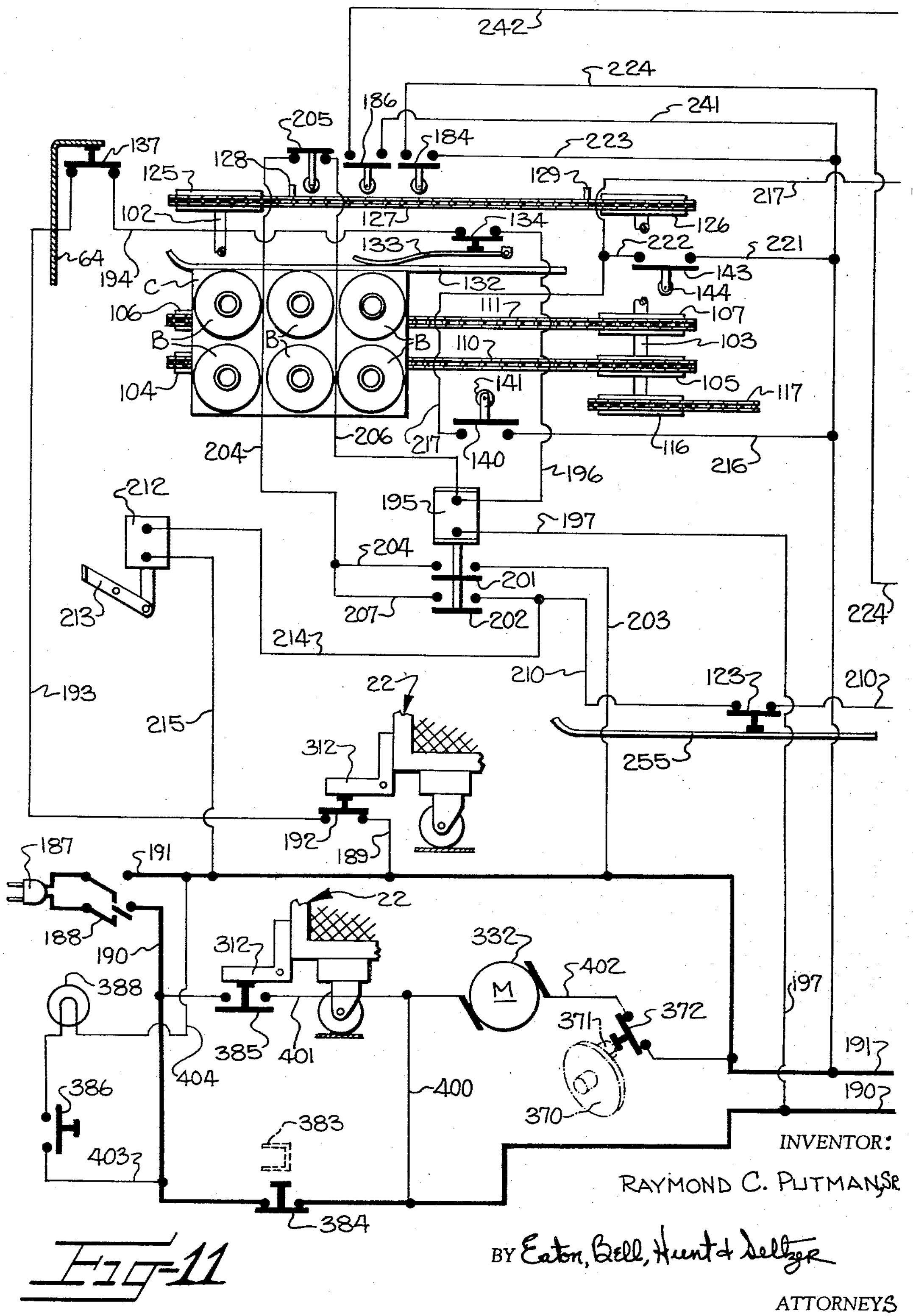

The control mechanism for the carton handling and coin refund mechanisms includes a wiring diagram shown in FIGURES 11 and 11A. A male plug 187 having a positive power line 190 and a negative or ground line 191 connected thereto is provided to be inserted in any suitable electrical outlet. Lines 190, 191 have a master switch 188 connected therein for breaking the circuit to the apparatus. A normally open safety switch 192 which is adapted to be closed by the main storage rack 22 in a manner to be later described is connected on one side to line 191 by a line 189. Switch 192 is connected to safety switch 137 which is adapted to be actuated, as aforementioned, by door 64 by a line 193.

Switch 137 is connected to the carton sensing switch 134 by a line 194 and carton sensing switch 134 is connected to a solenoid 195 by a line 196. A line 197 connects the opposite side of solenoid 195 to power line 190. Solenoid 195 is connected to a double switch 201, 202 and is adapted to close the same when energized.

A holding circuit is provided for solenoid 195 for maintaining the same energized after the carton sensing switch 134 is opened. The holding circuit comprises a line 203 connecting one side of switch 201 with ground line 191, a line 204 connected to the opposite side of switch 201 and to one side of a holding circuit breaking switch 205, a line 206 connected to the opposite side of breaking switch 205 and to solenoid 195, a line 207 connected to the line 204 intermediate the switches 201, 205 and to one side of switch 202, a line 210 connected to the opposite side of switch 202 and to one side of conveyor chain drive motor 121 through safety switch 123, and a line 211 connecting the opposite side of motor 121 with power line 190.

The holding circuit breaking switch 205 is mounted on bracket 185 in the path of the fingers 128, 129 on the control chain 127. When the conveyor chains 110, 111 reach a point in their rotation just prior to that shown in FIGURE 8, one of the fingers 128, 129 on the control chain

127 engages switch 205 opening the holding circuit and de-energizing solenoid 195. Upon de-energization of solenoid 195, switches 201, 202 are opened breaking the circuit to motor 121 and causing the motor to stop. It is noted that the momentum of the conveyor chains 110, 111 will carry them to the position shown in FIGURE 8.

A solenoid 212 is connected to a pivotally mounted latch 213 for latching door 64 in the closed position and is connected by a line 214 to the line 210 which connects motor 121 to switch 202. A line 215 connects the other side of solenoid 212 to the ground line 191. It will be apparent that when motor 121 is started the solenoid 212 will be energized locking door 64 in the closed position and when motor 121 is stopped solenoid 212 will be de-energized unlocking door 64 so that it may be moved to the open position.

Bottle sensing switch 140 is connected to ground line 191 by a line 216 and to solenoid 180 which turns the ratchet wheel 177 of totalizer 162 through pawl 178 by a line 217. Solenoid 180 is connected to the power line 190 by a line 220 to complete the circuit therethrough. Bottle sensing switch 143 is connected to the ground line 191 by a line 221 and to the line 217 which connects switch 140 to solenoid 180 by a line 222.

It will be apparent that, when switch 140 is closed by a bottle B, a circuit will be completed through lines 191, 216, 217, 220 and 190 to energize solenoid 180. Upon energization, solenoid 180 rotates ratchet wheel 177 one increment of rotation through pawl 178. Likewise, when switch 143 is closed by a bottle B, a circuit will be completed through lines 191, 221, 222, 217, 220 and 190 to energize solenoid 180 and move ratchet wheel 177 one increment of rotation in the manner aforementioned. It will therefore be seen that the ratchet wheel 177 will be rotated one increment of rotation for each bottle B contained in the carton C.

The pay-off switch 184 is connected to ground line 191 by a line 223 and to contact arms 174, 176 of totalizer 162 by a line 224. As aforementioned, the contact arms 174, 176 are adapted to sequentially engage the contacts 164–169 and 171-173. Contact 164 is connected by a line 225 to plate operating solenoid 157. Contacts 171 and 172 are connected to line 225 by lines 226 and 227, respectively. Solenoid 157 is connected to power line 190 by a line 230.

Contact 166 is connected to plate operating solenoid 160 by a line 231. Contacts 165 and 173 are connected to line 231 by lines 232 and 233, respectively. Solenoid 160 is connected to power line 190 by a line 234 to complete the circuit therethrough. Contact 169 is connected to plate operating solenoid 161 by a line 235 and contacts 167 and 168 are connected to line 235 by lines 236 and 237, respectively. Solenoid 161 is connected to power line 190 by a line 240 to complete the circuit therethrough.

It will be apparent that when the pay-off switch 184 is closed by either of the fingers 128, 129 on control chain 127 a circuit will be completed through the contact arms 174, 176 and any of the contacts 164–169 and 171–173 with which the arms are in contact to energize the respective solenoids 157, 160, 161 to which the contacts are connected to return the correct amount of coins corresponding to the deposit for the number of bottles contained in a carton passed through the carton receiving station.

Reset switch 186 is connected to ground line 191 by a line 241 and to the locking pawl releasing solenoid 183 by a line 242. Power line 190 is connected directly to the other side of solenoid 183 and completes the circuit therethrough. When the fingers 128, 129 move out of contact with pay-off switch 184, they move into contact with reset switch 186 completing the circuit to solenoid 183 through lines 241 and 242 to reset the totalizer 162 to the starting or zero position.

OPERATION OF CARTON HANDLING AND COIN REFUND MECHANISMS

The conveyor chains 110 and 111 are normally stopped with the carton engaging lugs 112, 113, 114 and 115 in either the position shown in FIGURES 3 and 8, or a position spaced 180 degrees therefrom so that when a carton C is placed in the carton receiving station, the forward edge of the carton will engage either the stop lug 114 or stop lug 115 which serves to position the carton within the carton receiving station and to prevent the customer from sliding the carton rearwardly in the carton receiving station to engage the bottle sensing switches 140 and 143. With the carton C in position on the carton support plates 100 and 101, the carton sensing arm 133 in engagement with the carton guide plate 132 will be pivoted to the left as seen in FIGURE 7 thereby closing the switch 134 in the electrical circuit of solenoid 195 (FIGURE 11).

Solenoid 195 is energized when the safety switch 137 is closed by door 64 being moved to the closed position. Solenoid 195 closes switches 201, 202 completing the circuit through lines 203, 204, 207, 210 and 211 to motor 121 thereby allowing electrical current to flow to the motor and start the same. When the circuit to motor 121 is completed, door locking solenoid 212 is energized to move the latch 213 into operative position to latch door 64 closed.

When the motor 121 is started, rotation will be imparted to the chains 110, 111 (FIGURE 3) so that either the lug 112 or lug 113 will engage the rear edge of the carton C and move the carton along the carton support plates 100 and 101 between the carton guiding plates 130 and 132. As the carton C moves along the support plates 100 and 101, each bottle on the righthand side of the carton will engage and momentarily close the switch 140 (FIGURE 7) thereby moving ratchet wheel 177 one increment of rotation in the manner aforementioned. When all of the bottles on the righthand side have been counted, each bottle on the lefthand side will engage and momentarily close the switch 143 thereby moving ratchet wheel 177 in like manner as switch 140. As the carton C leaves the carton support plates 100 and 101, it will move out of engagement with the carton guide plates 130, 132 and the carton sensing arm 133 will move out of engagement with switch 134 allowing the switch to open. The holding circuit, however, will maintain solenoid 195 energized until one of the fingers 128, 129 engages and opens the switch 205 thereby breaking the holding circuit and de-energizing the solenoid 195. Upon de-energization, solenoid 195 will open switches 201, 202 thereby breaking the circuit to motor 121 and stopping the same.

Prior to engaging the holding circuit breaking switch 205, the fingers 128, 129 will engage and close pay-off switch 184 to complete the circuit to coin plate actuating solenoids 157, 160 and 161 through the totalizer 162 in the manner aforementioned to return the correct amount of coins to the customer. Fingers 128, 129 will also engage and close reset switch 186 to complete the circuit to the solenoid 183 to reset the totalizer 162 to the zero position before engaging the holding circuit breaking switch 205.

It is noted that, before the circuit to motor 121 may be completed, the main storage rack 22 must be in position thereby closing the safety switch 192 and the carton shifting mechanism must be retracted thereby closing safety switch 123.

CARTON SHIFTING MECHANISM

When the carton C is moved off of the support plates 100 and 101 by either the lug 112 or 113, it will be slid onto a temporary carton storage platform 250. Temporary carton storage platform 250 (FIGURE 5) is mounted on the longitudinally extending frame members 73, 74 and extends from the rearward ends of brackets 80, 81 to transverse member 76. It will be noted that as each succeeding carton C is moved off of the carton support plates 100 and 101, the forward edge thereof will engage the rearward edge of the preceding carton and will slide the same and any preceding cartons along the temporary carton storage platform 250 until a series of four cartons have been transferred to the temporary carton storage platform 250 from the carton support plates 100 and 101.

When the fourth carton of a series of succeeding cartons is transferred from the carton support plates 100 and 101 to the temporary carton storage platform 250, the leading edge of the first carton in the series will engage a feeler rod or arm 251 normally held in the line of travel of the cartons on the temporary carton storage platform 250 by a spring arm 252. Feeler rod 251 is pivotally mounted at one end to bracket 83 and is adapted to be pivoted thereabout by the first carton in said series. Spring arm 252 engages and is adapted to close a normally open switch 253 to complete an electrical circuit to a carton transfer or shifting mechanism drive motor 254.

A carton shifter rod 255 extends for substantially the entire length of the temporary carton storage platform 250 adjacent one side thereof. It is noted that the forward end of the carton shifting rod 255 is flared outwardly adjacent the carton receiving station so that the cartons may be guided thereby onto the temporary carton storage platform 250. Carton shifting rod 255 is mounted on the slidable drawer frame 97 in any known manner and is movable therewith from a retracted position to an extended position shown in full and dash lines, respectively, in FIGURE 5. Drawer frame 97 has a longitudinal frame member 256 extending between either end thereof in parallel relationship to the sides. Member 256 has a pair of rollers 257, 260 mounted on the side thereof in spaced relation with roller 257 being larger than roller 260 for a reason to be presently described.

Figure 4:
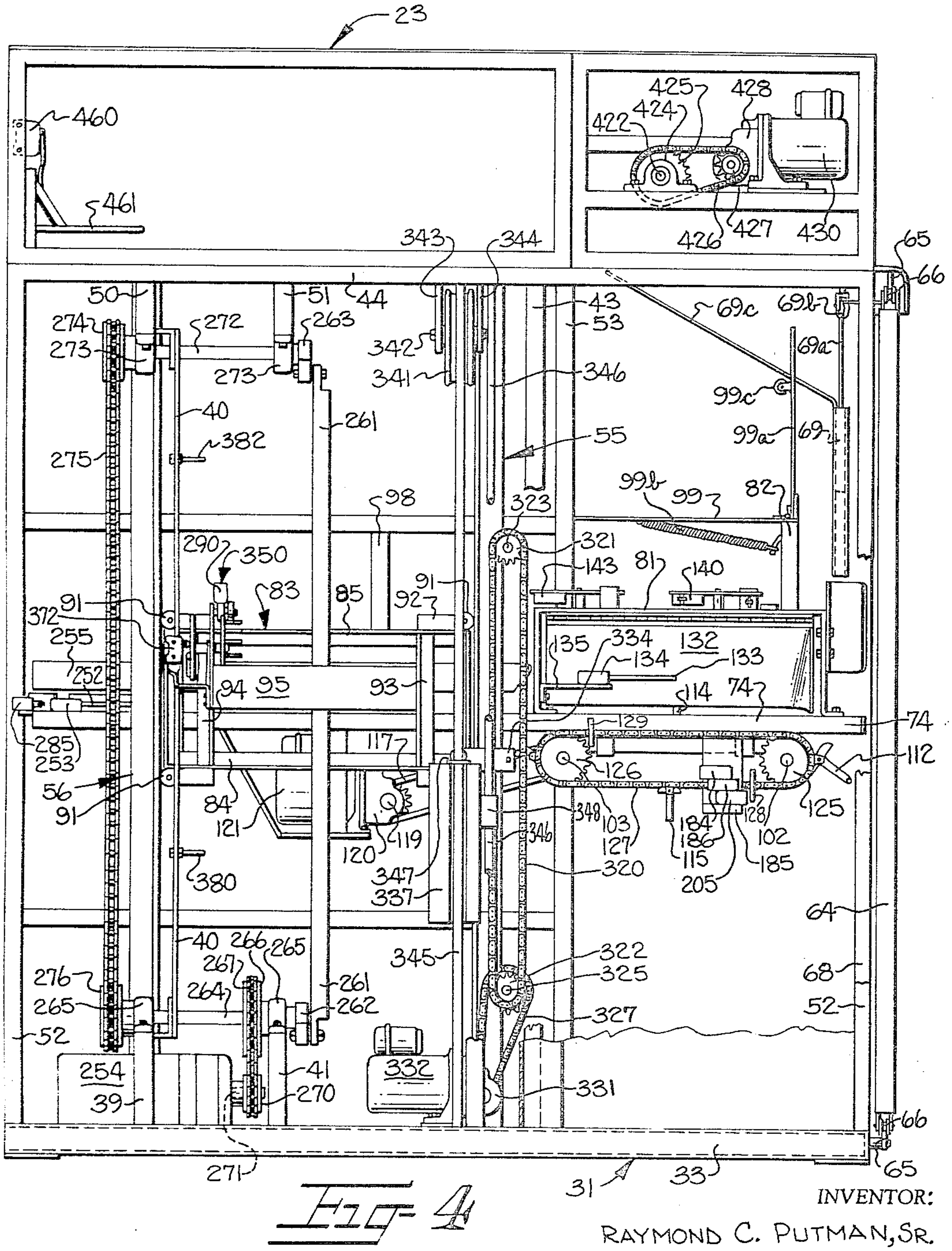
FIGURE 4 is a side elevation of the apparatus looking in the direction of arrow 4 in FIGURE 1 with the cover removed and with portions broken away and removed for clarity.
Figure 6:
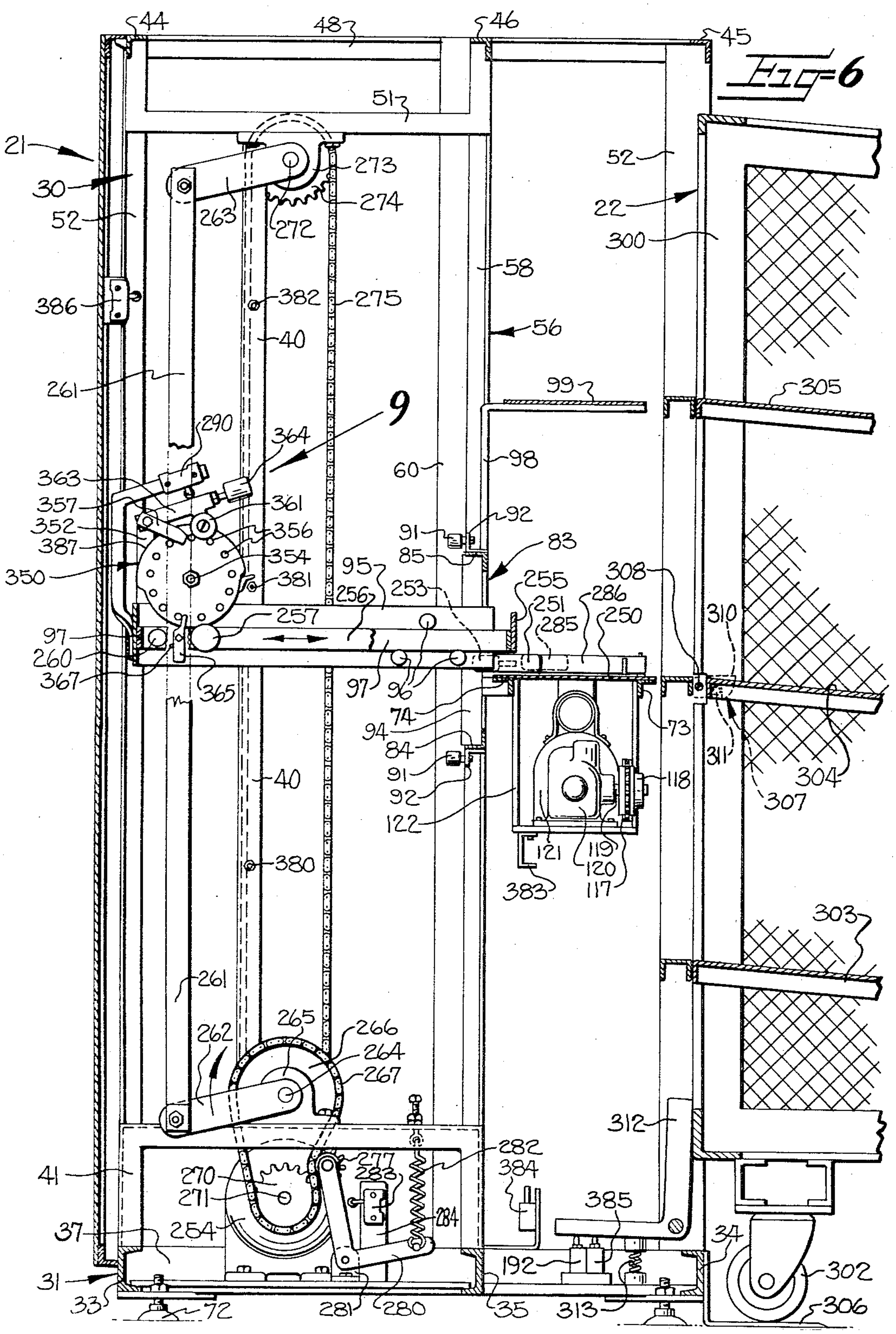
FIGURE 6 is a transverse vertical section taken substantially along line 6—6 of FIGURE 3 and showing a portion of the main storage rack in position adjacent the carton receiving portion of the machine.

Rollers 257, 260 have a push rod 261 mounted therebetween for moving the drawer frame 97 and associated carton shifting rod 255 from the retracted position to the extended position. Push rod 261 is attached at its lower end to a crank 262 and at its upper end to a crank 263 (FIGURES 4 and 6). Crank 262 is mounted on the end of a shaft 264 for rotation therewith, which in turn is mounted for rotation in suitable bearings 265 mounted on the frame brackets 39, 41. A sprocket 266 is mounted on shaft 264 in driving relationship and supports one end of a chain 267. Chain 267 is drivingly supported at its other end by a sprocket 270 which is mounted on the end of output shaft 271 of motor 254.

Crank 263 is mounted on the end of a shaft 272 for rotation therewith. Shaft 272 is mounted for rotation in suitable bearings 273 mounted on the frame brackets 50, 51. A sprocket 274 is mounted on the shaft 272 in driving relationship and supports one end of a chain 275 thereon. Chain 275 is drivingly supported at its other end by a sprocket 276 mounted on shaft 264 for rotation therewith.

It will be noted that chain 266 is engaged by a sprocket 277 (FIGURE 6) mounted on one leg of a bell-crank 280. Bell-crank 280 is pivotally mounted on a bracket 281 mounted on the frame 30. The other leg of bell-crank 280 is connected to one end of a suitable tension spring 282, the other end of which is connected to the bracket 41. Bell-crank 280 is adapted to be pivoted in a clockwise direction when the chain 267 is tightened due to any unduly large resistance to the movement of push rod 261. A safety switch 283 is mounted on a suitable bracket 284 mounted on the frame 30 adjacent the bell-crank 280. Switch 283 is of the normally closed type and is connected in the circuit of push rod drive motor 254. Switch 283 is adapted to be engaged and opened by bell-crank 280 when the same is rotated by the tightening of chain 267.

Another safety switch 285 (FIGURE 5) is mounted adjacent the rearmost end of the temporary carton storage platform 250. Switch 285 is engaged by a pivotally mounted feeler member 286. Feeler member 286 is biased outwardly toward the storage platform 250 by a suitable compression spring 287. Switch 285 is connected in the circuit to push rod drive motor 254 and is adapted when opened to break the same to prevent operation of the motor 254. It will therefore be apparent that if the cartons are pushed too far on the temporary carton storage platform 250 so that they would jam against the rear righthand corner member 52 of the carton receiving portion 21 the feeler member 284 will be pivoted about its pivot against the action of the compression spring 287 engaging the switch 285 and will break the circuit to the motor 254 preventing operation thereof to prevent damage to the apparatus or breakage of the bottles in the cartons. It is noted that a suitable alarm mechanism (not shown) may be connected to the switch 285 for giving the alarm that the apparatus has jammed.

A suitable holding circuit, to be later described, is provided for holding the motor 254 energized after the first carton in the series of four cartons has been moved out of engagement with the feeler rod 251 by the shifter rod 255 so that the motor 254 will continue to drive the shifter rod mechanism until the shifter rod 255 has returned to the retracted position. A holding circuit breaking switch 290 is mounted on a bracket 291 which, in turn, is mounted on the frame member 95. Switch 290 is of the normally closed type and is adapted to be engaged and opened when the carton shifting rod 255 is moved to the retracted position in a manner to be later described. The switch 290 is adapted to break the holding circuit to the motor 254 when the same is open so that the drive of the shifter rod mechanism will be terminated when the same is returned to the retracted position.

Safety switch 123 is mounted, as aforementioned, on bracket 83 in position to be engaged and closed by the carton shifter rod 255 when the same is in the retracted position. When shifter rod 255 moves to shift the series of four cartons off of the temporary storage platform 250, switch 123 opens preventing operation of conveyor chains 110, 111 so that no cartons may be placed on the temporary storage platform 250 until the shifter rod 255 has returned to the retracted position thereby preventing jamming of the carton shifting mechanism.

MAIN STORAGE RACK

The main storage rack 22 (FIGURE 1) is adapted to be positioned adjacent the carton receiving portion 21 for receipt of the cartons from the temporary storage platform 250 when the same are shifted off of the temporary storage platform 250 by the shifter rod 255. The main carton storage rack 22 comprises generally a box-like frame 300 constructed of suitable angle irons forming the edges of the sides, ends, top and bottom thereof. Frame 300 is covered by a suitable wire netting 301 or the like except for the end which is placed adjacent the carton receiving portion 21 which is left open. The main carton storage rack 22 is mounted on the surface by suitable caster wheels 302 for movement thereover.

Main storage rack 22 has a plurality of shelves 303, 304, 305 (FIGURES 1 and 6) mounted therein which are inclined from the end of the shelves opposite the carton receiving portion 21 upwardly to a point in alinement with the temporary storage platform 250 at each of its three positions. Shelves 303, 304, 305 are inclined so that the cartons C may more readily slide thereon to decrease the amount of force which must be applied to the cartons by shifter rod 255 to move the cartons off of the platform 250 and onto the associated shelves 303, 304 305. It is noted that as each succeeding series of four cartons are moved off of the platform 250 the leading edge thereof engages the previous series and moves the same rearwardly of the respective shelves 303, 304, 305 along with each of the preceding series.

A bracket 306 is mounted on the longitudinal frame member 34 of the carton receiving portion 21 to receive the forward wheels 302 of the main storage rack 22 thereon to position the forward portion of the rack in the correct position adjacent the carton receiving portion 21 and to position shelves 303, 304, 305 at the correct height adjacent the different positions of the temporary storage platform 250. A suitable locking mechanism 307 is provided for releasably securing the main storage rack 22 in position adjacent the carton receiving portion 21. Locking mechanism 307 comprises a spring loaded arm 308 mounted for rotation in suitable bearings (not shown) mounted on frame members 52 and 53. Arm 308 carries a pair of latch members 309, 310 having slots cut in the lower portion thereof for the reception of pins 311 mounted on opposite sides of the main storage rack frame 300. The latches 309, 310 have cam portions on the forward edges thereof and are adapted to be cammed upwardly, as seen in FIGURE 6, as the main storage rack 22 is moved into position adjacent the carton receiving portion. As the main storage rack reaches its operative position, the latches 309, 310 will move downwardly receiving pins 311 in the slots therein.

A bell-crank 312 (FIGURE 6) is pivotally mounted on the frame member 52 of the carton receiving portion and has a first leg extending upwardly into the path of main storage rack 22 when the same is placed in its operative position. A second leg of bell-crank 312 engages the safety switch 192 and is adapted to close the same when bell-crank 312 is moved about its pivot by rack 22 being moved into operative position. As aforementioned, switch 192 is connected in the conveyor chain motor circuit assuring that the carton receiving apparatus will not operate unless the main carton storage rack 22 is in operative position. Bell-crank 312 is spring pressed by a suitable compression spring 313 into position to be engaged by the main storage rack 22.

ELEVATOR DRIVE MECHANISM

As previously stated, the carton receiving station including the mechanisms for receiving the carton, moving the carton from the carton receiving station to the temporary storage platform, the storage platform and the carton shifting mechanism are all carried upon an elevator frame for vertical movement on the columns 55 and 56. The elevator frame and associated carton handling apparatus are moved vertically upwardly and downwardly on the columns 55, 56 by a drive chain 320 (FIGURES 3, 4, 5 and 10) supported at one end by an idler sprocket 321 and drivingly supported at the other end by a sprocket 322. Sprocket 321 is mounted on a shaft 323 which is journaled for rotation in a suitable bearing 324 carried by a suitable bracket mounted on the column 55. Sprocket 322 is mounted on a shaft 325 for rotation therewith which in turn is journaled for rotation in suitable bearings mounted on suitable brackets (not shown). A second sprocket 326 is drivingly mounted on shaft 325 and supports one end of a sprocket chain 327 which is drivingly supported at its other end by a sprocket 330. Sprocket 330 is mounted on the output shaft (not shown) of a suitable gear reduction unit 331 which is driven from an electric motor 332.

Figure 10:
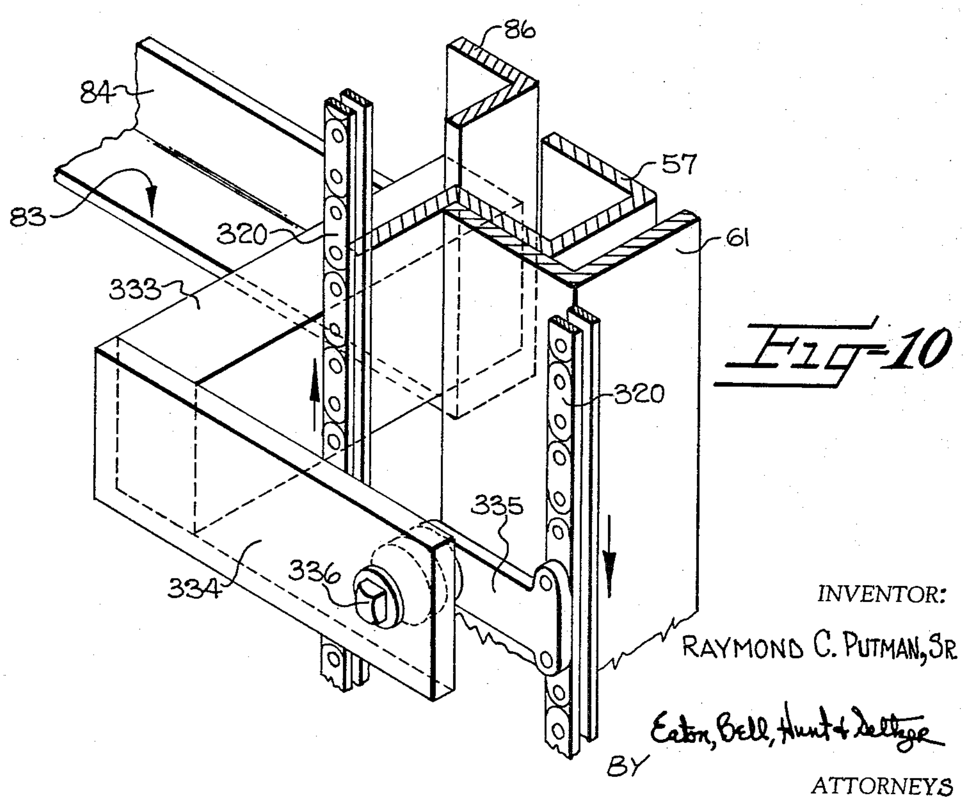
FIGURE 10 is an enlarged fragmentary perspective view showing means for connecting the elevator frame to its drive mechanism with parts in section and with portions broken away for clarity.

Bracket 83 of the elevator frame is connected to drive chain 320 by a bracket 333 and a pair of links 334, 335 (FIGURE 10). Bracket 333 is rigidly connected to bracket 83 and extends outwardly therefrom. Link 334 is rigidly mounted on bracket 333 at one end and extends transversely thereof in parallel relation to said chain. Link 335 is mounted on drive chain 320 by a pair of connections spaced longitudinally thereon such that link 335 is maintained perpendicular to chain 320 at all times. Links 334, 335 are connected together by a pivot 336 for relative pivotal movement. A counterweight 337 (FIGURES 3, 4 and 5) is connected to bracket 83 by a suitable cable 340. Cable 340 extends over a pulley 341 mounted on shaft 342 which is journaled at either end in brackets 343, 344. Counterweight 337 is guided in its vertical movement by vertically extending rods 345, 346 mounted on frame 30. Counterweight 337 is connected to rods 345, 346 by rings 347, 348 mounted on counterweight and loosely encircling the rods 345, 346, respectively.

CONTROL MECHANISM FOR ELEVATOR DRIVE

Figure 9:
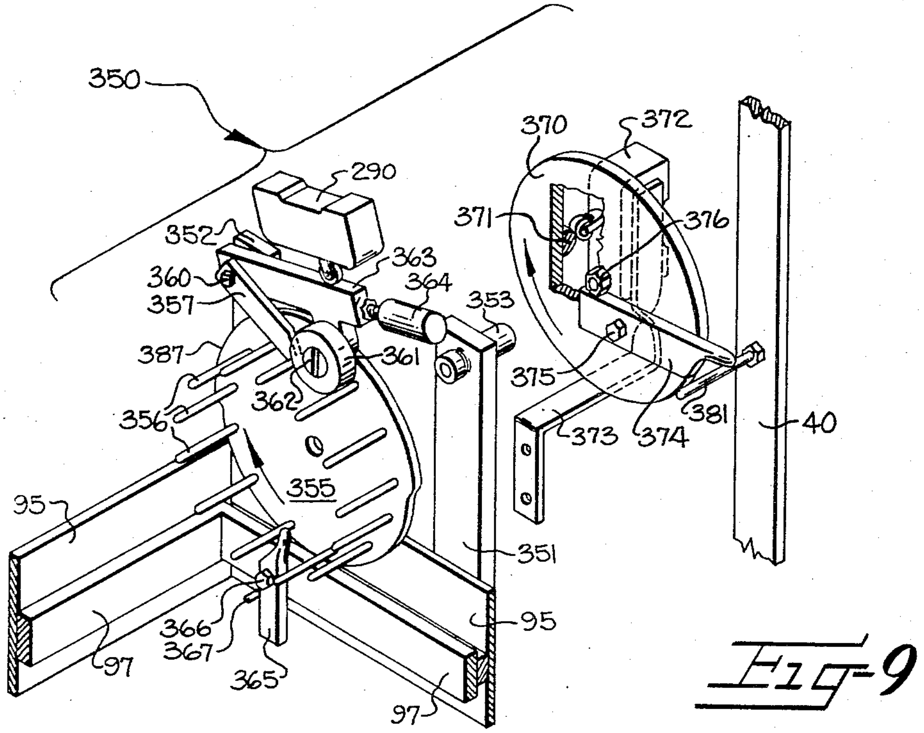
FIGURE 9 is an enlarged exploded isometric view looking in the direction of the arrow 9 in FIGURE 6 with portions broken away for clarity.

A control mechanism indicated broadly at 350 (FIGURES 6 and 9) is provided on the frame member 95 for controlling the operation of the elevator in its vertical movement. The elevator control mechanism 350 comprises a pair of upstanding bracket members 351, 352 connected to the frame member 95 at their lower ends. Bracket member 351 has a suitable bearing 353 mounted thereon for the reception of a shaft 354 for rotation therein. A counter wheel 355 is mounted on the shaft 354 in driving relation thereto. Counter wheel 355 has thirteen pins 356 projecting laterally from one side thereof and equally spaced therearound. A pivoted pawl 357 is mounted on the upstanding bracket member 352 by a suitable bolt 360 with a loose connection between the pawl 357 and the bolt 360 for free pivotal movement thereabout. Pawl 357 has its free end resting on one of the pins 356 and engaging another to prevent counterclockwise rotation of counter wheel 355.

A follower wheel 361 is mounted for rotation by a pin 362 on a member 363 pivotally mounted on bolt 360. Follower wheel 361 is held in engagement with some of the pins 356 by a weight 364 mounted on the end of the member 363. The holding circuit breaking switch 290 for the carton shifter rod motor 254 is positioned above the member 363 and is adapted to be engaged and opened by the top edge thereof when the roller 361 is moved upwardly by one of the pins 356 as the counter wheel 355 rotates to break the motor holding circuit and to stop motor 254.

Counter wheel 355 is rotated by a pawl 365 pivotally mounted on the drawer frame 97 by a pivot pin 366. A stop 367 (FIGURE 6) is mounted on the drawer frame 97 at a point spaced from the pivot pin 366 to prevent pivotal movement of the pawl 365 in a clockwise direction. As the drawer frame 97 is moved to the right, as seen in FIGURE 6, by the push rod 261, the upper end of the pawl 365 engages one of the pins 356 on the counter wheel 355. Due to its pivotal mounting, however, the pawl 365 will pivot about the pin 366 and will not attempt to rotate wheel 355 in a counterclockwise direction. As the drawer frame 97 is returned to the retracted position after moving a series of four cartons from the temporary storage platform 250 onto one of the shelves 303, 304, 305 of main storage rack 22, the upper end of pawl 365 will engage one of the pins 356 on the counter wheel 355. As drawer 97 continues its movement to the retracted position, the stop 367 will prevent pivotal movement of the pawl 365 in a clockwise direction, thereby rotating the counter wheel 355 one increment of its thirteen increments of rotation.

It is noted that each of the shelves 303, 304, 305 of the main storage rack 22 is capable of receiving forty-eight (48) cartons thereon in twelve (12) rows or series of four cartons. Since counter wheel 355 is rotated one increment of rotation by pawl 365 each time drawer frame 97 and associated shifter rod 255 are returned to the retracted position, counter wheel 355 will be rotated one increment of rotation for each series of four cartons placed on any one of shelves 303, 304, 305 until the counter wheel 355 has been rotated twelve (12) increments which will indicate that a particular shelf is filled.

A control wheel 370 is mounted on the opposite end of shaft 354 from the counter wheel 355 for rotation therewith. Control wheel 370 has a cam portion 371 thereon which is adapted to engage and close a switch 372 connected in the circuit of elevator drive motor 332 which drives the elevator mechanism in a manner previously described. Switch 372 is mounted on the upright bracket member 351 by a bracket 373. A pawl 374 is mounted on wheel 370 for pivotal movement by a pivot pin 375. A nut 376 which mounts the wheel 370 on the shaft 354 is positioned so that it will be engaged by one end of the pawl 374 to prevent clockwise rotation of the pawl from the position shown in FIGURE 9.

Three stop pins 380, 381, 382 are mounted on the vertically extending frame member 40 and protrude laterally thereof into the path of the outer end of pawl 374 when the control mechanism 350 is moved vertically upwardly or downwardly on the elevator mechanism. Pins 380, 381, 382 are spaced apart along member 40 a distance equal to the distance that the shelves 303, 304, 305 are spaced apart and are adapted to stop the elevator drive motor 332 when the temporary storage platform 250 on the elevator mechanism reaches a position in alinement with each of the shelves 303, 304, 305 in a manner to be presently described.

A bracket 383 is mounted on the bottom of motor support bracket 122. A safety switch 384 is mounted on the frame 30 below bracket 383 and in the path of travel thereof as the same moves downwardly with the elevator mechanism. Switch 384 is connected in the main power line 190 before the power line reaches any of the equipment to which it delivers electric current with one exception to be presently described. Switch 384 is of the normally closed type and is adapted to be engaged and opened by the bracket 383 when the elevator mechanism moves downwardly to its lowermost point.

A switch 385 is connected to power line 190 in parallel with switch 384. Switch 385 is mounted on frame 30 adjacent the switch 192 and is adapted to be engaged by the bell-crank 312 when the rack 22 is in its operative position. Switch 385 is of the normally closed type which is opened by bell-crank 312 when rack 22 is moved into operative position.

An alarm switch 386 is mounted on the back cover of the carton receiving portion 21 and is adapted to be engaged by a raised portion 387 on the counter wheel 355 when the elevator mechanism is in its uppermost position in alinement with the topmost shelf 305 of the main storage rack 22. Raised portion 387 of the counter wheel 355 is so positioned that it will engage the switch 386 when the counter wheel 355 has been rotated six increments of rotation or when the shelf 305 is half-filled with cartons. A suitable alarm mechanism 388, which may comprise a light, a bell or the like, is connected to switch 386 and is adapted to be energized to give warning that the storage rack 22 is almost full and that another rack should be made ready to be moved into operative position. It is noted that alarm mechanism 388 is connected into the power circuit before switch 384 so that it is not rendered inoperative thereby.

WIRING DIAGRAM FOR CARTON SHIFTING AND ELEVATOR MECHANISMS

The control mechanisms for the carton shifting and elevator mechanisms includes a wiring diagram shown in FIGURES 11 and 11A. Push rod drive motor 254 (FIGURE 11*A*) is connected to ground line 191 by a line 389. The other side of motor 254 is connected through safety switch 283 to one side of a normally open switch 390 by a line 391. The other side of switch 390 is connected to power line 190 by a line 392. A solenoid 393 is connected to switch 390 and is adapted when energized to close switch 390 to complete the circuit to motor 254.

A line 394 connects one side of carton sensing switch 253 to line 392. The other side of switch 253 is connected to one side of solenoid 393 through safety switch 285 by a line 395. A line 396 connects the other side of solenoid 393 to ground line 191 to complete the circuit thereto. It will therefore be seen that, when switch 253 is closed by a carton, solenoid 393 is energized closing switch 390 and starting motor 254.

A holding circuit, as aforementioned, is provided to maintain solenoid 393 energized after the carton has been moved out of contact with the feeler arm 251 and comprises a switch 397 connected to switch 390 and movable therewith to open and closed position. Switch 397 is connected to line 392 by a line 398 and is connected to solenoid 393 through holding circuit breaking switch 290 by a line 399. It will be seen that, once solenoid 393 is energized and switches 390 and 397 are closed, solenoid 393 will remain energized until the holding circuit breaking switch 290 is opened in the manner aforementioned.

Elevator drive motor 332 is connected to power line 190 after the switch 384 by a line 400. Switch 384 is by-passed by a line 401 connected at one end to power line 190 and at the other end to line 400. Switch 385 is connected into by-pass line 401 and is adapted to close and complete the by-pass of switch 384 when rack 22 is removed in a manner aforementioned. Motor 332 is connected to ground line 191 by a line 402 to complete the circuit thereto. Elevator drive motor control switch 372 is connected in line 402 and is adapted when closed by cam portion 371 on control wheel 370 to complete the circuit to motor 332 energizing the same.

Alarm mechanism 388 is connected through switch 386 to power line 190 by a line 403 between the source of power and switch 384. Alarm mechanism 388 is connected to ground line 191 by a line 404 completing the circuit therethrough.

OPERATION OF CARTON SHIFTING AND ELEVATOR MECHANISMS

In operation, the carton shifting mechanism operates when the leading edge of the first carton in a series of four cartons engages the feeler rod 251 and closes switch 253. Switch 253 completes the circuit through lines 394, 395 and 396 to solenoid 393 closing switches 390 and 397. Switch 390 completes a circuit through lines 389, 391 and 392 to motor 254 starting the same which rotates the output shaft 271. Shaft 271 rotates the sprocket 270 and hence the chain 267 which in turn rotates the sprocket 266 and shaft 264. Shaft 264 rotates the sprocket 276, chain and crank 262. Chain 275 rotates sprocket 274 and hence shaft 272 which rotates the crank 263. As cranks 262, 263 rotate, they move push rod 261 forwardly or to the right in the first two quadrants of rotation from the position shown in FIGURE 6 and rearwardly or to the left in the last two quadrants of rotation.

As the push rod 261 moves to the right, as seen in FIGURE 6, it will exert a force on the roller 257 mounted on the longitudinal member 256 moving the drawer frame 97 to the right on the rollers 96. Drawer frame 97 moves the carton shifting rod 255 carried thereby to the position shown in dash lines in FIGURE 5 pushing the series of four cartons off of the temporary storage plaftorm 250 into the main storage rack 22. As the crank arms 262, 263 rotate through the last two quadrants of rotation, the push rod 261 will move the drawer frame 97 and associated carton shifter rod 255 to the left as seen in FIGURE 6 by pushing on the roller 260 on the frame member 256.

As the four cartons are moved off of the temporary storage platform 250, switch 253 will open because the leading carton has moved out of contact therewith. However, motor 254 will continue to run since switch 397 maintains solenoid 393 energized through lines 392, 398, 399 and 396. As the carton shifter rod 255 returns to the retracted position, counter wheel 355 will be rotated by pawl 365 which will move roller 361 and its associated member 363 upwardly opening the switch 290, breaking line 399 and de-energizing solenoid 393. De-energization of solenoid 393 will open switch 390 stopping motor 254.

As aforementioned, the roller 257 is larger than the roller 260 since when the carton shifter rod 261 is moving to the right as seen in FIGURE 6 it is pushing the four cartons supported on the temporary carton storage platform 250 and must have a greater force applied thereto. When the drawer frame 97 and associated shifter rod 255 are moving to the left, the push rod 261 must only move the weight of the drawer frame 97 and associated shifter rod 255 and therefore the push rod 261 does not have to apply as much force and consequently the roller 260 need not be as large as the roller 257.

In operation, the elevator mechanism is moved from one position to another after each shelf of the plurality of shelves 303, 304, 305 is filled with cartons. Counter wheel 355 determines when each shelf is filled by being rotated a number of increments of rotation equal to the number of rows or series of cartons which each shelf may hold. As shown in the present instance, when counter wheel 255 has been rotated twelve increments of rotation, the particular shelf 303, 304 or 305 will be filled and the elevator mechanism is ready to be moved to the next station to position the platform 250 in alinement with one of the remaining shelves.

Control wheel 370 rotates with the counter wheel 355 and cam portion 371 will be moved into engagement with and will close the switch 372 upon the twelfth increment of rotation of the counter wheel 355 occuring after twelve series of four cartons have been transferred to any one of the shelves 303, 304, 305. Switch 372 will complete the circuit through lines 400 and 402 to the elevator drive motor 332 allowing electric current to be applied thereto and to energize the same. Motor 332 will move the elevator mechanism through the drive chain 320 upwardly until the next position in the vertical movement of the elevator mechanism is reached.

When the elevator mechanism arrives at the next position in its vertical movement, pawl 374 will engage one of the pins 380, 381, 382 and as the elevator mechanism continues its vertical movement will rotate control wheel 370 one increment, which is the last of the thirteen increments, which is sufficient movement for the cam portion 371 to move out of contact with the switch 372 opening the same and cutting off the electrical current to the motor 332 thereby stopping the vertical movement of the elevator mechanism. It will be noted that the pawl 374 will then be below the respective pins 380, 381, 382 and, as the wheel 370 rotates, will move therewith from a position below the pin to the position above the pin shown in FIGURE 9 which will allow it to continue on to the next succeeding station without rotating control wheel 370 until such next station is reached.

When the elevator mechanism arrives at the uppermost point in its vertical movement and has filled the topmost shelf 305 of the main storage rack 22, the same will be moved downwardly toward the first station in its vertical movement and the pawl 374 will engage each of the pins 380, 381, 382 in its downward movement but will pivot about its pivot pin 375 and will not rotate the wheel 370 and stop the running of the motor 332. The motor 332 will, through the drive chain 320, move the elevator mechanism downwardly past the first position to its lowermost point.

When the elevator mechanism reaches its lowermost point, bracket 383 engages and opens switch 384 thereby breaking power line 190 and rendering the apparatus inoperative. The alarm mechanism 388, as aforementioned, is the only part of the apparatus not rendered inoperative. Since switch 385 is maintained open by bell-crank 312 as long as rack 22 is in operative position, the by-pass circuit to the elevator drive motor 332 will remain broken thereby preventing vertical movement of the elevator mechanism when bracket 383 is in contact with switch 384. When the full rack 22 is removed from operative position for the insertion of an empty rack, bell-crank 312 will be moved about its pivot by spring 282 allowing switch 385 to close and complete the circuit which by-passes switch 384 and energizes the elevator drive motor 332.

Motor 332 when re-energized moves the elevator mechanism upwardly until pawl 374 engages the lowermost pin 380 rotating control wheel 370. Cam portion 371 is thereby moved out of contact with switch 372 stopping the motor 332 with the temporary storage platform 250 at its first position. It is noted that when the elevator mechanism is moved to the first position, bracket 383 is moved out of contact with switch 384 allowing the same to close and complete the power line 190 so that when switch 385 is reopened by the empty rack 22 being moved into operative position the apparatus may be operated. It is also noted that no cartons may be inserted in the carton receiving portion when switch 385 by-passes switch 384 since switch 192 is open and the circuit to the conveyor chain drive motor 121 is broken.

INDIVIDUAL BOTTLE RECEIVING PORTION

The individual bottle receiving portion 23 comprises generally a frame of any suitable construction covered by sheet material 405 and wire netting 406 and having an opening therein adapted to be closed by a door 407 which is hingedly mounted on said frame for movement to open or close said opening. Door 407 has a bracket 408 (FIGURE 12) mounted thereon which is adapted to engage the individual bottle and move the same into correct position on floor 409 of individual bottle receiving portion 23.

A feeler arm 410 is pivotally mounted at one end to the frame of the portion 23 and extends into the bottle receiving portion above the floor 409. Feeler arm 410 is adapted to be engaged by a bottle B and moved from the position shown in full lines to the position shown in dash lines in FIGURE 12. A switch arm 411, constructed of spring material, contacts the feeler arm 410 at one end and a switch 412 at the other end. Switch arm 411 is adapted to close switch 412 when feeler arm 410 is moved to the dash line position shown in FIGURE 12.

A bottle conveyor comprising a bottle engaging member 413 extends forwardly into the bottle receiving station to a point adjacent the door 407 above the floor 409. Bottle engaging member 413 has four rollers 414 mounted thereon. Rollers 414 are received between tracks 415, 416 (FIGURE 15) for rolling movement thereon to impart reciprocatory movement to said bottle engaging member 413 from a retracted position to an extended position, the retracted position being shown in full lines and the extended position being shown in dashed lines in FIGURE 12. A bracket 417 (FIGURE 12) is mounted on bottle engaging member 413 at one end and extends outwardly therefrom between the tracks 415, 416. A link 418 is pivotally mounted on bracket 417 at one end by a pivot pin 419 for free pivotal movement relative thereto. The other end of link 418 is pivotally connected to a crank 420 by a pivot pin 421 for free pivotal movement relative thereto.

Crank 420 is mounted on a shaft 422 at its other end for rotation therewith which in turn is journaled in suitable bearings 423, 424 for rotation therein. A sprocket 425 is drivingly mounted on shaft 422 and supports one end of a chain 426. A sprocket 427 drivingly supports the other end of chain 426 and is mounted on the output shaft of a suitable gear reduction unit 428. Gear reduction unit 428 is driven by an electric motor 430 in a known manner.

A first bottle sensing switch 431 (FIGURE 16) is mounted on a suitable bracket 432 and has a feeler arm 433 thereon spaced above floor 409 such that it extends into the path of movement of 6, 8 or 12 ounce bottles B through the individual bottle receiving portion. Bracket 432 is mounted on a bracket 434 which is pivotally mounted on the cover of portion 23 by a bolt 435. Bracket 434 has an upstanding pin 436 thereon which is connected to one end of a tension spring 437, the other end of which is connected to a pin 440 mounted on the cover of portion 23. Spring 437 biases pivotal bracket 434 into the position shown in FIGURE 13 with the feeler arm 433 in position to be engaged by a bottle being carried along the floor 409 by bottle engaging member 413.

A second bottle sensing switch 441 is mounted on bracket 434 and has a feeler arm 442 thereon extending into the path of a bottle being moved along the floor 409 by bottle engaging member 413. It is noted that bracket 434 and switch 441 are spaced a sufficient distance above floor 409 that all 6, 8 and 12 ounce bottles will pass thereunder without engaging the same. Therefore, only 32 ounce bottles will engage the feeler arm 442 and actuate switch 441.

Figures 12, 13, 14:
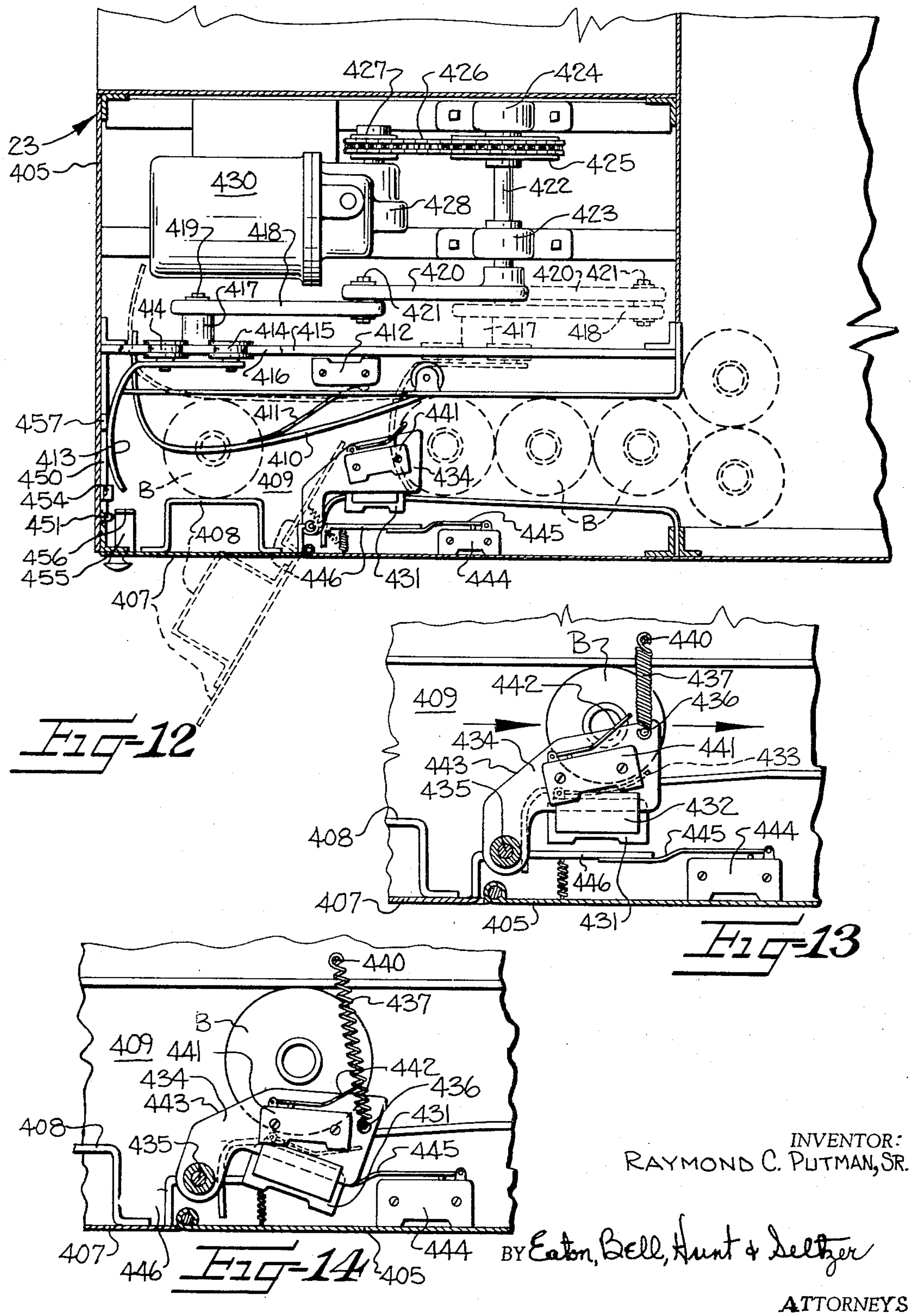
FIGURE 12 is an enlarged fragmentary top plan view looking in the direction of arrows 12 in FIGURE 1 with the cover removed showing the mechanism inside.
FIGURE 13 is an enlarged fragmentary detailed view showing the bottle sensing means shown in FIGURE 12.
FIGURE 14 is an enlarged fragmentary detail of the mechanism shown in FIGURE 13 showing a large bottle being moved through the bottle sensing means.
Figures 15, 16, 17:
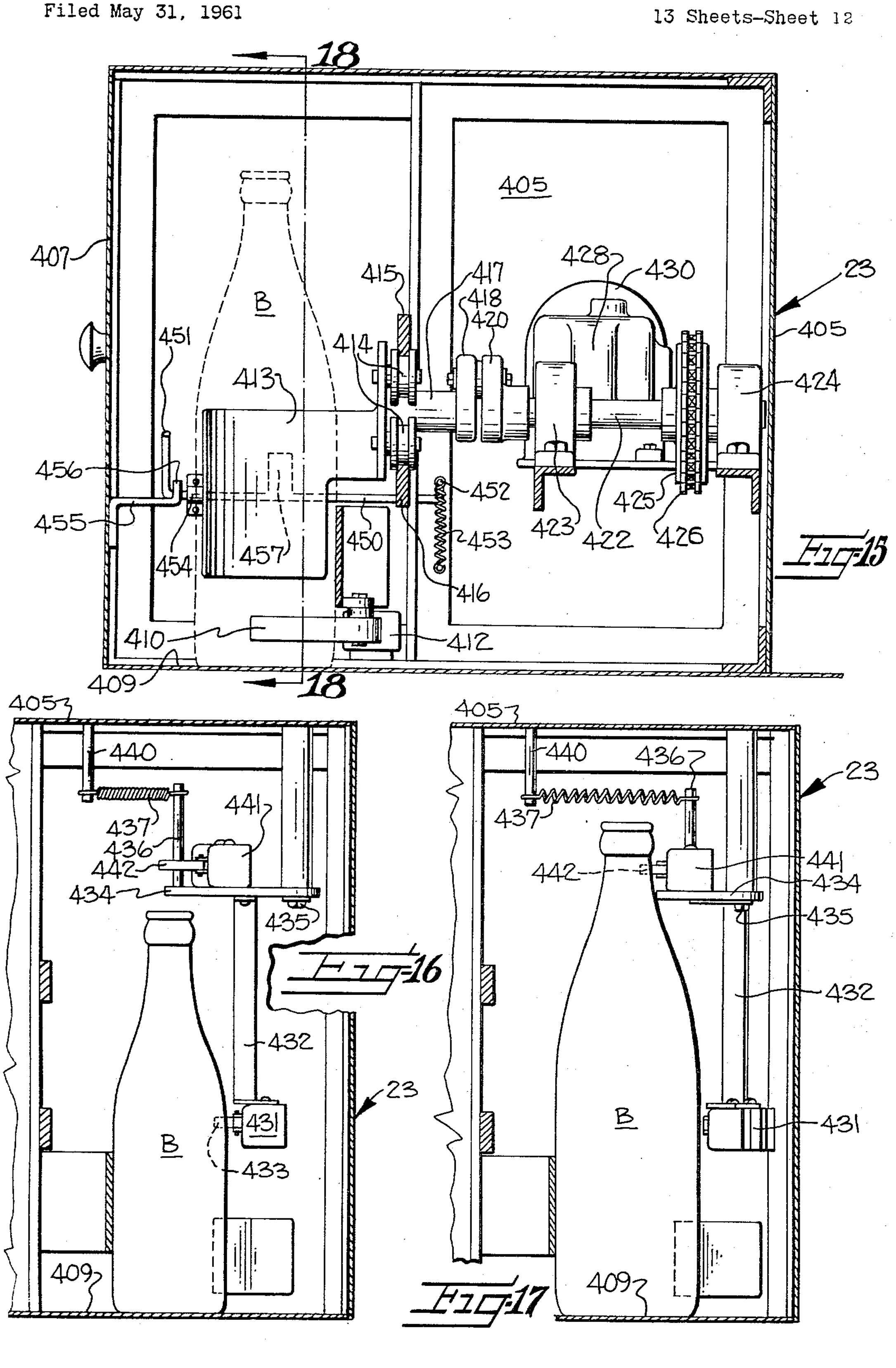
FIGURE 15 is an enlarged sectional view taken substantially along line 15—15 of FIGURE 3 with portions broken away and removed for clarity.
FIGURE 16 is an enlarged section taken substantially along line 16—16 of FIGURE 3 with portions broken away.
FIGURE 17 is an enlarged fragmentary section showing the apparatus shown in FIGURE 16 with a large bottle moving therethrough.
Figure 18:
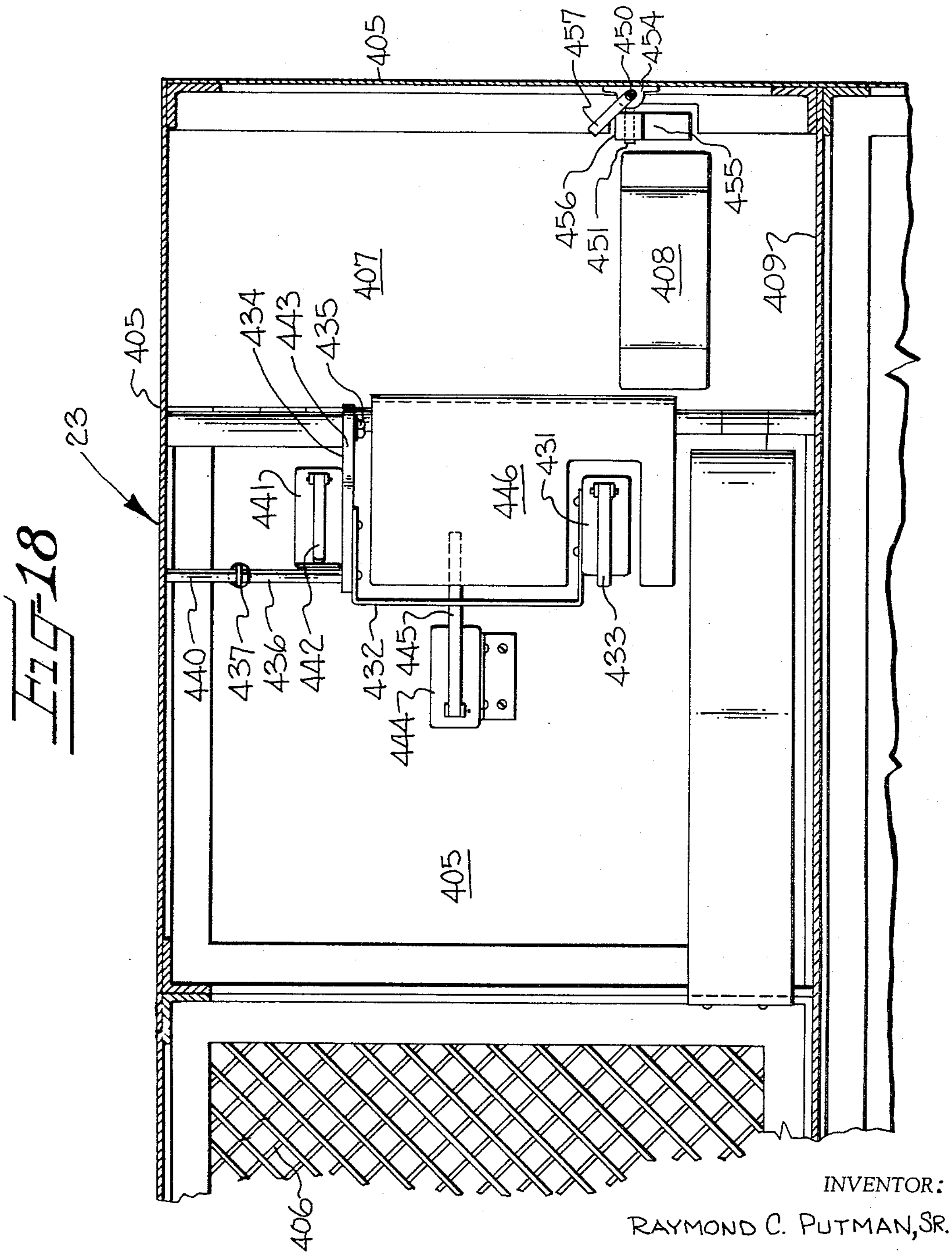
FIGURE 18 is an enlarged fragmentary sectional view taken substantially along line 18—18 of FIGURE 15.

Bracket 434 has a cam portion 43 (FIGURES 13 and 14) thereon which is positioned in the path of the large size or 32 ounce bottle as the same is moved along floor 409 and is adaped to be engaged thereby. As the large size bottle is moved along floor 409 of the individual bottle receiving portion, the neck portion thereof will engage the cam portion 443 and will pivot bracket 434 about its pivot 435 causing the first bottle sensing switch 431 to move out of the path of the large size bottle so that only the second bottle sensing switch 441 is engaged thereby (FIGURES 14 and 17). It will therefore be seen that only first bottle sensing switch 431 is actuated by 6, 8 or 12 ounce bottles and only second bottle sensing switch 441 is actuated by 32 ounce bottles.

Switch 431 is connected to solenoid 157 (FIGURE 11A) of the coin refund mechanism 150 to energize the same and return to the customer the correct amount of coins for each 6, 8 or 12 ounce bottle placed in the bottle receiving portion. Switch 441 is connected to solenoid 160 of the coin refund mechanism 150 for refunding to the customer the deposit on all 32 ounce bottles placed in the bottle receiving portion.

It is noted that switches 431, 441 are of the double pole type and have one pole thereof connected in line 224 from pay-off switch 184 to the totalizer 162 (FIGURE 11A). The switches 431, 441 are adapted to break line 224 when they are engaged by an individual bottle to prevent the energization of solenoids 157, 160, 161 by pay-off switch 184 when said solenoids are being energized by switches 431, 441. This safety feature prevents the loss of either a carton of bottles or an individual bottle without the receipt of a refund or prevents a customer from receiving a refund for a carton of bottles when he has returned only an individual bottle.

It is noted that a safety switch 444 (FIGURE 13) is mounted on the individual bottle receiving portion frame and has an arm 445 thereon adapted to be engaged by a bracket 446 mounted on the door 407. Switch 444 is adapted to be held closed when the door 407 is in the closed position and is adapted to open when door 407 is moved to the open position. Switch 444 prevents actuation of the motor 430 when door 407 is in the open position to prevent injury to anyone who might have their hand within the individual bottle receiving portion when the bottle conveyor means is actuated.

A further safety device is provided comprising a latching arm 450 (FIGURE 15) having a first portion 451 at one end extending outwardly from the main portion at a right angle thereto and a second portion 452 at the other end which also extends at a right angle thereto and is connected to one end of a suitable tension spring 453, the other end of which is connected to the individual bottle receiving portion frame. Latching arm 450 is mounted for rotation in suitable brackets 454, only one of which is shown. Tension spring 453 biases the latching arm portion 452 downwardly as seen in FIGURE 15. Portion 451 is adapted to be moved downwardly thereby into engagement with a bracket 455 mounted on the door 407. Bracket 455 has an upwardly extending portion 456 which extends upwardly behind the portion 451 when the same is in the downward position.

An upstanding portion 457 is attached to or formed integrally with the latch arm 450 and is engaged by the bottle engaging member 413 when the same is in the retracted position. The bottle engaging member 413 is adapted to pivot the latch arm 450 against the action of the tension spring 453 to lift the portion 451 from contact with the bracket 455 when the conveying mechanism is in the retracted position as shown in FIGURE 12 which will allow the door 407 to be opened. It is noted that when the bottle engaging member 413 moves out of contact with the upstanding portion 457, the spring 453 will move the portion 451 into contact with the bracket 455 latching the door 407 in the closed position during the operation of the bottle conveying means.

A limit switch 460 (FIGURES 3 and 4) is mounted on the rear cover of the individual bottle receiving portion 23. A feeler member 461 is mounted on switch 460 and depends therefrom. Feeler member 461 is adapted to be engaged by bottles B when the individual bottle receiving portion 23 becomes filled with bottles. Feeler member 461 actuates switch 460 to prevent energization of motor 430 to prevent operation of the bottle conveying mechanism when the storage area is filled with bottles. A suitable alarm (not shown) may be connected to switch 460 to indicate that portion 23 is full of bottles and should be emptied.

WIRING DIAGRAM FOR INDIVIDUAL BOTTLE HANDLING MECHANISM

The control mechanism for the individual bottle handling mechanism includes a wiring diagram shown in FIGURE 11A. Bottle conveyor drive motor 430 is connected to power line 190 by a line 462 through bottle sensing switch 412 and limit switch 460. Motor 430 is connected to ground line 191 by a line 463 through the safety switch 444.

Bottle sensing switch 431 is connected to solenoid 157 of the coin refund mechanism by a line 464 and is connected to ground line 191 by a line 465 which is connected to line 463 by a line 466. Bottle sensing switch 441 is connected to solenoid 160 of the coin refund mechanism by a line 467 and is connected to line 466 which is connected to line 463 by a line 470.

As aforementioned, switches 431 and 441 are of the double pole type and have one pole 431*a* and 441*a* connected in the line 224 from the carton pay-off switch 184 to the totalizer contact arms 174, 176. It is noted that, when switches 431, 441 are engaged by an individual bottle, poles 431*a*, 441*a* are opened, breaking the circuit from pay-off switch 184 to the solenoids 157, 160, 161 so that only one refund may be returned at any one time.

OPERATION OF INDIVIDUAL BOTTLE HANDLING MECHANISM

In operation, when the customer desires to return bottles of any size which are not in a carton, he opens door 407 and places the bottles one at a time in the opening on the floor 409. After each bottle is inserted, door 407 is moved to the closed position. Bracket 408 engages the bottle and moves it into correct position within the bottle receiving portion. As the bottle is moved into position, it engages the feeler arm 410 moving the same about its pivot and actuating the switch 412 through the switch arm 411.

Switch 412 completes a circuit to motor 430 through lines 462 and 463 which allows electrical current to flow thereto energizing the same. Motor 430 drives the gear reduction unit 428 which rotates the sprocket 427. Sprocket 427 rotates the chain 426 which in turn rotates sprocket 425. Sprocket 425 rotates shaft 422 and crank 420 mounted thereon. As crank 420 rotates, link 418 is reciprocated from the full line position to the dash line position shown in FIGURE 12 and back again. Link 418 moves the bottle engaging member 413 therewith to move the bottles along the floor 409 from a position adjacent door 407 to the storage portion of the individual bottle receiving portin 23. It is noted that when each of the bottles reaches the storage portion, the same moves out of engagement with feeler arm 410 and switch 412 is opened by switch arm 411 thereby deenergizing motor 430. It is further noted that crank 420 has sufficient momentum to return bottle engaging member 413 to the starting position where the same strikes upstanding portion 457 of latch arm 450 raising the same to the vertical position and coming to rest thereagainst.

As the bottles are moved along the floor 409 by bottle engaging member 413, all 6, 8 or 12 ounce bottles engage the feeler arm 433 actuating switch 431 completing an electrical circuit through lines 463, 466, 465, 464 and 230 and energizing solenoid 157 to return a refund in accordance with the size of this bottle. As a 32 ounce bottle is moved along the floor 409, the neck portion thereof engages the cam portion 443 on the bracket 434 moving the bracket about its pivot 435 which moves the feeler arm 433 out of the path of the 32 ounce bottle so that it will not engage the same and actuate switch 431. Feeler arm 442 is engaged by the 32 ounce bottle actuating the switch 441 completing an electrical circuit through lines 463, 466, 470, 467 and 234 and energizing solenoid 160 to return a refund in accordance with the size of this bottle.

When the storage portion is filled with bottles, feeler arm 461 will be engaged actuating switch 460. Switch 460 opens or breaks line 462 to motor 430 preventing operation thereof until the storage portion is emptied of bottles. Switch 460 when actuated may energize an alarm (not shown) to inform the store employees or machine operators that the storage portion is filled and the machine has been rendered inoperative.

From the foregoing description of the disclosed method of the invention, it is evident that the disclosed apparatus will receive and store both confined bottles contained in cartons as well as unconfined individual bottles of varying size, with a common mechanism for dispensing a refund in accordance with the number and size of bottles received.

In the drawings and specification there has been set forth a preferred embodiment of the invention and, although specific terms are employed, they are used in a generic and descriptive sense only and not for purposes of limitation, the scope of the invention being defined in the claims.

I claim:

1. Apparatus for successively receiving cartons having two parallel rows of bottles confined therein and unconfined individual bottles, said apparatus comprising first receiving means for successively receiving cartons of bottles, first sensing means operatively associated with said carton receiving means for sensing each bottle in the two rows of bottles in each carton received, second receiving means for successively receiving unconfined bottles, second sensing means operatively associated with said bottle receiving means for sensing the presence of each unconfined bottle received, and common refund means responsive to actuation of said first sensing means for dispensing a composite refund for the total number of bottles sensed in each carton received and responsive to actuation of said second sensing means for dispensing a refund for the unconfined bottles received.

2. Apparatus for successively receiving cartons having two parallel rows of bottles confined therein and unconfined individual bottles of varying size, said apparatus comprising first receiving means for successively receiving cartons of bottles, first sensing means operatively associated with said carton receiving means for sensing each bottle in the two rows of bottles in each carton received, second receiving means for successively receiving unconfined bottles of varying size, second sensing means operatively associated with said bottle receiving means for sensing the presence and size of each unconfined bottle received, and common refund means responsive to actuation of said first sensing means for dispensing a composite refund for the total number of bottles sensed in each carton received and responsive to actuation of said second sensing means for dispensing a refund for each unconfined bottle received in accordance with the size thereof.

3. Apparatus according to claim 2 wherein said common refund means includes coin return means for storing coins of various denominations and for dispensing the correct number and denomination of coins required for the composite refund for the total number of bottles in each carton received and for the refund for each individual bottle received in accordance with the size thereof.

4. Apparatus for successively receiving cartons having bottles confined therein and unconfined individual bottles of varying size, said apparatus comprising a carton receiving station for successively receiving cartons having bottles therein, carton conveying means operatively associated with said carton receiving station for moving each carton through and out of said carton receiving station, first bottle sensing means operatively associated with said carton receiving station for sensing the number of bottles present in each carton received, a bottle receiving station for successively receiving unconfined bottles, bottle conveying means operatively associated with the bottle receiving station for moving the bottles through and out of said bottle receiving station, second bottle sensing means positioned in the path of movement of the bottles through and out of said bottle receiving station for sensing the presence and size of each unconfined bottle received, and common refund means responsive to actuation of said first bottle sensing means for determining the total number of bottles present in each carton received and operable upon movement of a carton out of said carton receiving station for dispensing a composite refund for the total number of bottles in each carton received and responsive to actuation of said second bottle sensing means for dispensing a refund for each unconfined bottle received in accordance with the size thereof.

5. Apparatus according to claim 4 including carton sensing means operatively associated with said carton receiving station for actuation in response to receipt of a carton therein and operatively connected to said carton conveying means for actuating said carton conveying means upon the receipt of a carton in said carton receiving station, and a third bottle sensing means operatively associated with said bottle receiving station for actuation in response to receipt of a bottle therein and being operatively connected to said bottle conveying means for actuating said bottle conveying means in response to the receipt of a bottle into said bottle receiving station.

6. Apparatus according to claim 4 wherein said common refund means includes means responsive to actuation of said first bottle sensing means for totaling the number of bottles sensed by said first sensing means in each carton received, coin return means operatively associated with said totaling means for storing coins of various denominations and operable when actuated to return a predetermined number of coins of the various denominations, and means operable in timed relation to the movement of each carton out of said carton receiving station by said carton conveying means for actuating said totaling means and said coin return means to dispense the correct number and denomination of coins required for a composite refund for the total number of bottles in each carton received, said coin return means being operatively connected to said second bottle sensing means and being responsive to actuation thereof for dispensing the required number and denomination of coins as a refund for each unconfined bottle received in accordance with the size thereof.

7. Apparatus for successively receiving cartons having two parallel rows of bottles confined therein and unconfined individual bottles, said apparatus comprising a carton receiving station for successively receiving cartons of bottles, carton conveying means operatively associated with said carton receiving station for moving each carton through and out of said carton receiving station, first bottle sensing means comprising switch means disposed on opposite sides of the path of travel of a carton through and out of said carton receiving station and disposed in position to be successively engaged by each bottle in the two rows of bottles confined in a carton, a bottle receiving station for successively receiving unconfined bottles, bottle conveying means operatively associated with the bottle receiving station for moving the bottles through and out of said bottle receiving station, second bottle sensing means positioned in the path of movement of the bottles through and out of said bottle receiving station for sensing the presence and size of each unconfined bottle received, and common refund means responsive to each actuation of said switch means of said first bottle sensing means for totaling the number of bottles sensed in each carton received and operable upon movement of each carton out of said carton receiving station for dispensing a composite refund for the total number of bottles in each carton received, and responsive to actuation of said second bottle sensing means for dispensing a refund for each unconfined bottle received in accordance with the size thereof.

8. An apparatus according to claim 7, including a housing enclosing said carton receiving station, said carton conveying means, said first bottle sensing means, said bottle receiving station, said bottle conveying means, said second bottle sensing means and said common refund means, said housing having door means at said carton receiving station and movable between open and closed positions to provide access to said carton receiving station, and further including means operatively associated with said door means and operatively connected to said carton conveying means for preventing operation of said carton conveying means when said door means is in open position and permitting operation of said carton conveying means when said door means is in closed position.

9. Apparatus according to claim 8, including second door means in said housing at said bottle receiving station and movable between open and closed positions to provide access to said bottle receiving station, and further including means operatively associated with said second door means and operatively connected to said bottle conveying means for preventing operation of said bottle conveying means when said second door means is in open position and permitting operation of said bottle conveying means when said second door means is in closed position.

10. Apparatus for successively receiving cartons having two parallel rows of bottles confined therein and unconfined individual bottles, said apparatus comprising a housing, a carton receiving station within said housing for successively receiving cartons of bottles, first door means in said housing movable between open and closed positions for providing access to said carton receiving station, carton conveying means operatively associated with said carton receiving station for moving each carton through and out of said carton receiving station, mean operatively associated with said first door means and operatively connected to said carton conveying means for permitting operation of said carton conveying means when said first door means is in closed position and for preventing operation of said carton conveying means when said first door means is in open position, carton sensing means disposed at said carton receiving station and adapted to be actuated upon receipt of a carton within said carton receiving station, said carton sensing means being connected to said carton conveying means for actuating said carton conveying means upon a carton being received in said carton receiving station, first bottle sensing means comprising first and second switch means disposed one on each side of the path of travel of each carton through and out of said carton receiving station and including feeler means extending into the path of travel of the two rows of bottles confined in each carton for successive engagement with each bottle in each carton for sensing the presence thereof, a bottle receiving station for successively receiving unconfined bottles, second door means in said housing at said bottle receiving station and movable between open and closed positions for providing access to said bottle receiving station, bottle conveying means operatively associated with said bottle receiving station for moving the unconfined bottles through and out of said bottle receiving station, means operatively associated with said second door means and operatively connected to said bottle conveying means for preventing operation of said bottle conveying means when said second door means is in open position and for permitting operation of said bottle conveying means when said second door means is in closed position, second bottle sensing means positioned at said bottle receiving station and adapted to be actuated upon the receipt of an unconfined bottle therein, said second bottle sensing means being operatively connected to said bottle conveying means for actuating said bottle conveying means upon the receipt of an unconfined bottle in said bottle receiving station, third bottle sensing means comprising superposed third and fourth switch means positioned in the path of movement of the bottles through and out of said bottle receiving station and at different heights corresponding to the different size bottles for sensing the presence and size of each unconfined bottle received, and common refund means including means responsive to each successive actuation of said first and second switch means of said first bottle sensing means for totaling the number of bottles present in each carton received, coin return means operatively associated with said totaling means for storing coins of various denominations and operable when actuated to return a predetermined number of the coins of the various denominations, and means operable in timed relation to the movement of each carton out of said carton receiving station by said carton conveying means for actuating said totaling means and said coin return means to dispense the correct number and denomination of coins required for a composite refund for the total number of bottles in each carton received, said coin return means being operatively connected to said third and fourth switch means of said second bottle sensing means and being responsive to each actuation thereof for dispensing the required number and denomination of coins as a refund for each unconfined bottle received in accordance with the size thereof.

11. Apparatus for successively receiving cartons having two parallel rows of bottles confined therein and then refunding a composite refund for the total number of bottles in each carton received, said apparatus comprising carton receiving means for successively receiving cartons of bottles, first sensing means operatively associated with said carton receiving means for sensing each bottle in the two rows of bottles in each carton received, and refund means operatively connected to said sensing means and responsive to each actuation thereof for totaling the number of bottles in each carton received and for dispensing a composite refund for the total number of bottles sensed in each carton received.

12. Apparatus for successively receiving cartons having two parallel rows of bottles confined therein and then refunding a composite refund for the total number of bottles in each carton received, said apparatus comprising a carton receiving station adapted to successively receive cartons of bottles, carton conveying means operatively associated with said carton receiving station for conveying each carton of bottles through and out of said carton receiving station, bottle sensing means positioned on opposite sides of said carton conveying means and in the path of the two rows of bottles in each carton as the carton is moved through and out of said carton receiving station for sensing each bottle in each carton received, and refund means operatively connected to said bottle sensing means for totaling the number of bottles sensed in each carton and operable in timed relation to movement of each carton out of said carton receiving station for dispensing a composite refund for the total number of bottles sensed in each carton received.

13. Apparatus according to claim 12 wherein said refund means includes coin return means for storing coins of various denominations and for dispensing the correct number and denomination of coins required for the composite refund for the total number of bottles sensed in each carton received.

14. Apparatus for successively receiving cartons having two parallel rows of bottles therein and then refunding a composite refund for the total number of bottles in each carton received, said apparatus comprising a housing, door means in said housing movable between open and closed positions to provide access to the interior thereof, a carton receiving station within said housing at said door means and adapted to successively receive cartons of bottles therein through said door means, a carton storage station within said housing adjacent said carton receiving station, carton conveying means operatively associated with said carton receiving station for successively conveying cartons through and out of said carton receiving station and into said storage station, means operatively associated with said door means and operatively connected to said conveyor means for preventing operation of said conveyor means when said door means is in open position and for permitting operation of said conveyor means when said door means is in closed position, bottle sensing means operatively associated with said carton receiving station and said conveyor means for sensing each bottle in the two rows of bottles in each carton received as the carton is moved through and out of said carton receiving station, and refund means including means responsive to each actuation of said bottle sensing means for totaling the number of bottles sensed in each carton received and operable upon actuation to dispense a composite refund for the total number of bottles sensed in each carton received, and means responsive to movement of each carton out of said carton receiving station and into said storage station for actuating said totaling and dispensing means to dispense a composite refund for the total number of bottles sensed in each carton received.

15. Apparatus according to claim 14, including carton sensing means operatively associated with said carton receiving station and adapted to be actuated upon the receipt of a carton in said carton receiving station, said carton sensing means being operatively connected to said conveyor means for actuating said conveyor means upon the receipt of a carton within said carton receiving station.

16. Apparatus for successively receiving cartons having two parallel rows of bottles therein and then refunding a composite refund for the total number of bottles in each carton received, said apparatus comprising a housing, door means in said housing movable between open and closed positions to provide access to the interior thereof, a carton receiving station within said housing at said door means and adapted to successively receive cartons of bottles therein through said door means, a carton storage station within said housing on the opposite side of said carton receiving station from said door means, carton conveying means operatively associated with said carton receiving station for successively conveying cartons through and out of said carton receiving station and into said carton storage station, carton sensing means operatively associated with said carton receiving station and adapted to be actuated upon the receipt of a carton in said carton receiving station and operatively connected to said conveyor means for actuating said conveyor means upon the receipt of a carton in said carton receiving station, means operatively associated with said door means and operatively connected to said conveyor means in series with said carton sensing means for preventing operation of said conveyor means when said door means is in open position and for permitting operation of said conveyor means when said door means is in closed position, bottle sensing means including first and second switch means disposed one on each side of said conveyor means and including feeler means extending into the path of the two rows of bottles in each carton as the carton is moved through and out of said carton receiving station, and refund means including means responsive to each actuation of said first and second switch means for totaling the number of bottles sensed in each carton received, coin return means operatively connected to said totaling means for storing coins of various denominations and operable when actuated to dispense the correct number and denomination of coins as a composite refund for the total number of bottles sensed in each carton and means operatively connected to said coin return means and responsive to movement of each carton out of said carton receiving station and into said storage station for actuating said coin return means to dispense the composite refund.

17. Apparatus for successively receiving cartons containing bottles and then refunding a predetermined value for each bottle received comprising a base, a pair of vertically extending tracks mounted on said base, an elevator mechanism mounted for vertical movement on said tracks, a carton receiving station mounted on said elevator mechanism and adapted to successively receive cartons having bottles therein, carton sensing means positioned at said carton receiving station and adapted to be actuated in response to the insertion of a carton therein, carton conveying means mounted on said elevator mechanism and extending into said carton receiving station, said conveying means being operable in response to actuation of said carton sensing means to move a carton through and out of said carton receiving station, bottle sensing means positioned to sense the presence of each bottle in each carton as the same is carried through said carton receiving station, a temporary storage platform mounted on said elevator mechanism adjacent said carton receiving station and adapted to receive cartons therefrom, a main storage rack positioned adjacent to said temporary storage platform and having a plurality of vertically spaced shelves, said main storage rack being adapted to receive cartons from said temporary storage platform, carton shifting means responsive to the receipt of a predetermined number of cartons on said temporary storage platform for transferring said predetermined number of cartons from said platform to one of the shelves of said main storage rack, means for driving said elevator mechanism to sequentially position said temporary storage platform in alinement with each of said plurality of shelves in said main storage rack, and means responsive to actuation of said bottle sensing means for dispensing a refund in accordance with the number of bottles present in each carton received.

18. Apparatus for successively receiving cartons containing bottles and then refunding a predetermined value for each carton received comprising a frame, a cover mounted on and surrounding said frame and having first and second openings therein, a pair of vertically extending tracks mounted on said frame within said cover, an elevator mechanism mounted for vertical movement on said tracks, a carton receiving station mounted on said elevator mechanism in alinement with the first opening in said cover and adapted to receive a carton having bottles therein, first carton sensing means positioned at said carton receiving station and adapted to be actuated in response to the insertion of a carton therein, carton conveying means mounted on said elevator mechanism and extending into said carton receiving station, said carton conveying means being operable in response to actuation of said first carton sensing means to move a carton through and out of said carton receiving station, bottle sensing means positioned to sense the presence of each bottle in each carton as the same is carried through said carton receiving station, a temporary storage platform mounted on said elevator mechanism adjacent said carton receiving station and adapted to receive cartons therefrom, a main storage rack positioned adjacent said temporary storage platform in alinement with the second opening in said cover and having a plurality of vertically spaced shelves adapted to receive cartons therefrom, drive means for moving said elevator mechanism on said tracks to sequentially position said temporary storage platform in alinement with each of said plurality of shelves, second carton sensing means positioned at said temporary storage platform and adapted to be actuated in response to the receipt of a predetermined number of cartons thereon, carton shifting means mounted on said elevator mechanism adjacent said temporary storage platform and operable in response to actuation of said second carton sensing means to transfer said predetermined number of cartons from said temporary storage platform to one of said plurality of shelves, and means responsive to actuation of said bottle sensing means for dispensing a refund in accordance with the number of bottles present in each carton received.

19. The apparatus as set forth in claim 2 wherein said bottle sensing means comprises a first switch mounted on said elevator mechanism and extending into the path of travel of the bottles on one side of a carton being moved through said carton receiving station, and a second switch mounted on said elevator mechanism spaced from said first switch along the path of travel of the carton and being a distance at least equal to the length of a carton and extending into the path of travel of bottles contained in the other side of said carton whereby said switches are adapted to be sequentially actuated by each bottle on the respective sides of said carton.

20. Apparatus for successively receiving cartons containing bottles and then refunding a predetermined value for each bottle received comprising a frame, a cover mounted on and surrounding said frame and having first and second openings for the ingress and egress of a carton therethrough, respectively, a pair of vertically extending tracks mounted on said frame within said cover, an elevator mechanism mounted for vertical movement on said tracks, a carton receiving station mounted on said elevation mechanism adjacent said first opening in said cover and adapted to receive a carton having bottles therein, first carton sensing means positioned at said carton receiving station and adapted to be actuated in response to the insertion of a carton therein, carton conveying means mounted on said elevator mechanism and extending into said carton receiving station, said carton conveying means operable in response to actuation of said first carton sensing means to move a carton through and out of said carton receiving station, bottle sensing means positioned to sense the presence of each bottle in each carton as the same is carried through said carton receiving station, a temporary storage platform mounted on said elevator mechanism adjacent said carton receiving station, and said second opening in said cover and adapted to receive cartons from said carton conveying means, a main storage rack positioned adjacent said temporary storage platform and said second opening and having a plurality of vertically spaced shelves adapted to receive cartons from said temporary storage platform, second carton sensing means positioned at said temporary storage platform and adapted to be actuated in response to the receipt of a predetermined number of cartons on said temporary storage platform, carton shifting means mounted on said elevator mechanism adjacent said temporary storage platform and operable in response to actuation of said second carton sensing means to transfer said predetermined number of cartons from said temporary storage platform to one of said plurality of shelves, means for driving said elevator mechanism to sequentially position said temporary storage platform in alinement with each of said plurality of shelves, door means movable between an open and closed position for closing the first opening in said cover, switch means connected to said carton conveying means, said carton shifting means, and said elevator drive means and adapted to be engaged and closed by said door means only when the same is moved to the closed position thereby preventing operation thereof when said door means is in the open position, and means responsive to actuation of said bottle sensing means for dispensing a refund in accordance with the number of bottles in each carton received.

21. Apparatus for successively receiving cartons containing bottles and then refunding a predetermined value for each bottle received comprising a frame, a pair of vertically extending tracks mounted on said frame, an elevator mechanism mounted for vertical movement on said tracks, a carton receiving station mounted on said elevator mechanism and adapted to receive a carton having bottles therein, carton sensing means positioned at said carton receiving station and adapted to be actuated in response to the insertion of a carton therein, carton conveying means mounted on said elevator mechanism and operable in response to actuation of said carton sensing means to move a carton through and out of said carton receiving station, bottle sensing means positioned to sense the presence of each bottle in each carton as the same is carried through said carton receiving station, a temporary storage platform mounted on said elevator mechanism adjacent said carton receiving station and adapted to receive cartons therefrom, a main storage rack positioned adjacent said temporary storage platform and having a plurality of vertically spaced shelves adapted to receive cartons thereon from said temporary storage platform, second carton sensing means positioned at said temporary storage platform and adapted to be actuated in response to the receipt of a series of cartons of a predetermined number on said temporary storage platform, carton shifting means mounted on said elevator mechanism and operable in response to actuation of said second carton sensing means to transfer said series of cartons from said temporary storage platform to one of said plurality of shelves, counter means mounted on said elevator mechanism and adapted to be actuated upon each transfer of cartons from said temporary storage platform to each of said shelves, switch means mounted adjacent said counter means and adapted to be actuated thereby when a predetermined number of series of cartons have been transferred to each shelf of said plurality of shelves, means responsive to actuation of said switch means for moving said elevator mechanism on said tracks to sequentially position said temporary storage platform in alinement with each of said plurality of shelves, and means responsive to actuation of said bottle sensing means for dispensing a refund in accordance with the number of bottles in each carton received.

22. Apparatus for successively receiving unconfined individual bottles of varying size and then refunding a predetermined value in accordance with the size of each bottle received, said apparatus comprising a housing, door means in said housing movable between open and closed positions to provide access to the interior thereof, a bottle receiving station within said housing at said door means for the successive receipt of the unconfined bottles therein, bottle conveying means operatively associated with said bottle receiving station for successively moving each bottle received through and out of said bottle receiving station, first bottle sensing means positioned at said bottle receiving station and adapted to be actuated in response to the receipt of a bottle therein, said first bottle sensing means being operatively connected to said bottle conveying means for actuating the same upon receipt of a bottle in said bottle receiving station, means operatively associated with said door means and operatively connected to said conveying means for preventing operation of said bottle conveying means when said door means is in open position and for permitting operation of said bottle conveying means when said door means is in closed position, second bottle sensing means comprising first and second superposed switch means positioned at different heights above said bottle conveying means and in the path of travel of the varying size bottles for sensing the size of each individual bottle, and means responsive to actuation of said second bottle sensing means for dispensing a refund in accordance with the size of each unconfined bottle received.

23. Apparatus according to claim 22, including means carried by said door means for movement therewith and engageable with bottles received in said bottle receiving station for moving each bottle received into engagement with said first bottle sensing means upon said door means being moved to closed position.

24. Apparatus for successively receiving unconfined individual bottles of varying height and refunding a predetermined value in accordance with the height thereof, said apparatus comprising a housing, door means in said housing movable between open and closed positions for providing access to the interior thereof, a bottle receiving station within said housing at said door means for the successive receipt of unconfined bottles therein, first bottle sensing means operatively associated with said bottle receiving station and adapted to be actuated upon the receipt of a bottle therein, means carried by said door means and movable therewith and engageable with bottles received in said bottle receiving station for moving the same into engagement with said first bottle sensing means upon movement of said door means to closed position for actuating said first bottle sensing means, bottle conveying means operable in response to actuation of said first bottle sensing means for moving each bottle through and out of said bottle receiving station, means operatively associated with said bottle conveying means and said door means for preventing operation of said bottle conveying means when said door means is in open position and for permitting operation of said conveying means when said door means is in closed position, means operatively associated with said bottle conveying means and said door means and responsive to actuation of said bottle conveying means for locking said door means in closed position to prevent access to the interior of said housing during operation of said bottle conveying means, second bottle sensing means positioned in the path of movement of bottles through and out of said bottle receiving station and comprising first and second superposed switches mounted in the path of travel of the bottles through said bottle receiving station at heights corresponding to the varying size bottles adapted to be received in said bottle receiving station, and means responsive to actuation of said second bottle sensing means for dispensing a refund in accordance with the height of each individual bottle.

References Cited

UNITED STATES PATENTS

| | | | |
|---|---|---|---|
| 1,897,072 | 2/1933 | Parks | 194—4 |
| 2,345,355 | 3/1944 | Neal | 198—37 X |
| 2,644,735 | 7/1953 | James | 194—10 |
| 2,661,100 | 12/1953 | Ashford | 214—16.4 |
| 2,681,758 | 6/1954 | Lipson | 198—221 |
| 2,827,159 | 3/1958 | Peteler | 198—221 |
| 2,896,784 | 7/1959 | Greenamyer | 194—4 |
| 2,908,440 | 10/1959 | Gurewitz | 194—4 |
| 2,992,717 | 7/1961 | Putman | 194—4 |
| 2,999,576 | 9/1961 | Glembring | 194—4 |
| 3,015,376 | 1/1962 | Glembring | 194—4 |
| 3,039,583 | 6/1962 | Menefee | 194—4 |

EVON C. BLUNK, *Primary Examiner.*

SAMUEL F. COLEMAN, EDWARD A. FALLER, WILLIAM B. LA BORDE, H. C. HORNSBY, *Assistant Examiners.*